(12) United States Patent
Arendt et al.

(10) Patent No.: US 10,513,595 B2
(45) Date of Patent: Dec. 24, 2019

(54) MONOBENZOATE ANALOGS USEFUL AS PLASTICIZERS IN PLASTISOL COMPOSITIONS

(71) Applicant: EMERALD KALAMA CHEMICAL, LLC, Kalama, WA (US)

(72) Inventors: William D. Arendt, Libertyville, IL (US); Emily McBride, Kalama, WA (US); Steven D. Roth, Ridgefield, WA (US); Jerry Andrews, Woodland, WA (US)

(73) Assignee: EMERALD KALAMA CHEMICAL, LLC, Kalama, WA (US)

( * ) Notice: Subject to any disclaimer, the term of this patent is extended or adjusted under 35 U.S.C. 154(b) by 0 days.

(21) Appl. No.: 15/510,880

(22) PCT Filed: Sep. 25, 2015

(86) PCT No.: PCT/US2015/052265
§ 371 (c)(1),
(2) Date: Mar. 13, 2017

(87) PCT Pub. No.: WO2016/049479
PCT Pub. Date: Mar. 31, 2016

(65) Prior Publication Data
US 2017/0253725 A1   Sep. 7, 2017

Related U.S. Application Data

(60) Provisional application No. 62/056,109, filed on Sep. 26, 2014.

(51) Int. Cl.
*C08K 5/101* (2006.01)
*C08K 5/00* (2006.01)
(Continued)

(52) U.S. Cl.
CPC .............. *C08K 5/101* (2013.01); *C09J 11/06* (2013.01); *C09J 123/0853* (2013.01);
(Continued)

(58) Field of Classification Search
CPC .... C08K 5/0016; C08K 5/101; C07C 69/003; C07C 69/007; C07C 69/78; C07C 69/612;
(Continued)

(56) References Cited

U.S. PATENT DOCUMENTS 5,236,987 A  8/1993  Arendt
6,689,830 B1  2/2004  Arendt et al.
(Continued)

FOREIGN PATENT DOCUMENTS

JP        07247241 A  *  9/1995
WO    2013 123127 A1     8/2013
(Continued)

OTHER PUBLICATIONS

Li et al., "Highly Enantioselective Iridium-Catalyzed Hydrogenation of α,β-Unsaturated Esters," Chemistry: A European Journal, 18, 10609-10616 (2012).*
(Continued)

Primary Examiner — Kregg T Brooks
(74) Attorney, Agent, or Firm — Hudak, Shunk & Farine Co. LPA

(57) ABSTRACT

Unique 3-PPB monobenzoate analogs useful as plasticizers in polymeric dispersions, such as plastisols, melt compounds, and adhesives among other applications. The analogs are structurally similar to and/or derived from 3-phenylpropyl benzoate and heretofore were not known for use in industrial applications, particularly not as a plasticizer in polymeric applications. Depending on the application, the advantages rendered by the use of the inventive monobenzoate analogs include, among other things, excellent solvating properties and rheology, low viscosity and significantly improved viscosity over time, comparable or improved Tg suppression, set and open times, as well as health, safety and environmental advantages, over traditional plasticizers.

8 Claims, 20 Drawing Sheets

-- Brookfield Viscosity Data

(51) Int. Cl.
*C08L 27/06* (2006.01)
*C09J 123/08* (2006.01)
*C08L 23/08* (2006.01)
*C09J 131/04* (2006.01)
*C08L 31/04* (2006.01)
*C09J 11/06* (2006.01)
*C09J 133/06* (2006.01)
*C09J 133/08* (2006.01)
*C09J 133/00* (2006.01)
*C08L 33/00* (2006.01)
*C08L 33/06* (2006.01)
*C08L 33/08* (2006.01)

(52) U.S. Cl.
CPC ............ *C09J 131/04* (2013.01); *C08K 5/0016* (2013.01); *C08K 2201/019* (2013.01); *C09J 2205/102* (2013.01); *C09J 2423/04* (2013.01); *C09J 2431/00* (2013.01)

(58) Field of Classification Search
CPC ........ C07C 69/614; C08L 31/04; C08L 33/00; C08L 33/04; C08L 23/0853; C08L 27/06; C09J 131/04; C09J 123/0853; C09J 133/00; C09J 133/04
See application file for complete search history.

(56) References Cited

U.S. PATENT DOCUMENTS

| | | | |
|---|---|---|---|
| 6,762,230 | B2 | 7/2004 | Brandenburger et al. |
| 7,629,413 | B2 | 12/2009 | Godwin et al. |
| 7,638,568 | B2 | 12/2009 | Grass et al. |
| 8,609,884 | B2 | 12/2013 | Davies et al. |
| 2005/0152858 | A1 | 7/2005 | Bertz et al. |
| 2013/0169921 | A1* | 7/2013 | Orsi Mazzucchelli ..................... B29D 12/02 351/41 |
| 2013/0274395 | A1 | 10/2013 | Arendt et al. |
| 2013/0302537 | A1* | 11/2013 | Lee ............................ C08J 5/18 428/1.31 |
| 2014/0275376 | A1 | 9/2014 | Arendt et al. |
| 2015/0361311 | A1* | 12/2015 | Combs .................. C09J 101/12 428/535 |

FOREIGN PATENT DOCUMENTS

WO 2013 123149 A2 8/2013
WO 2013 123188 A2 8/2013

OTHER PUBLICATIONS

Machine translation of JP H07-247241 A.*

* cited by examiner

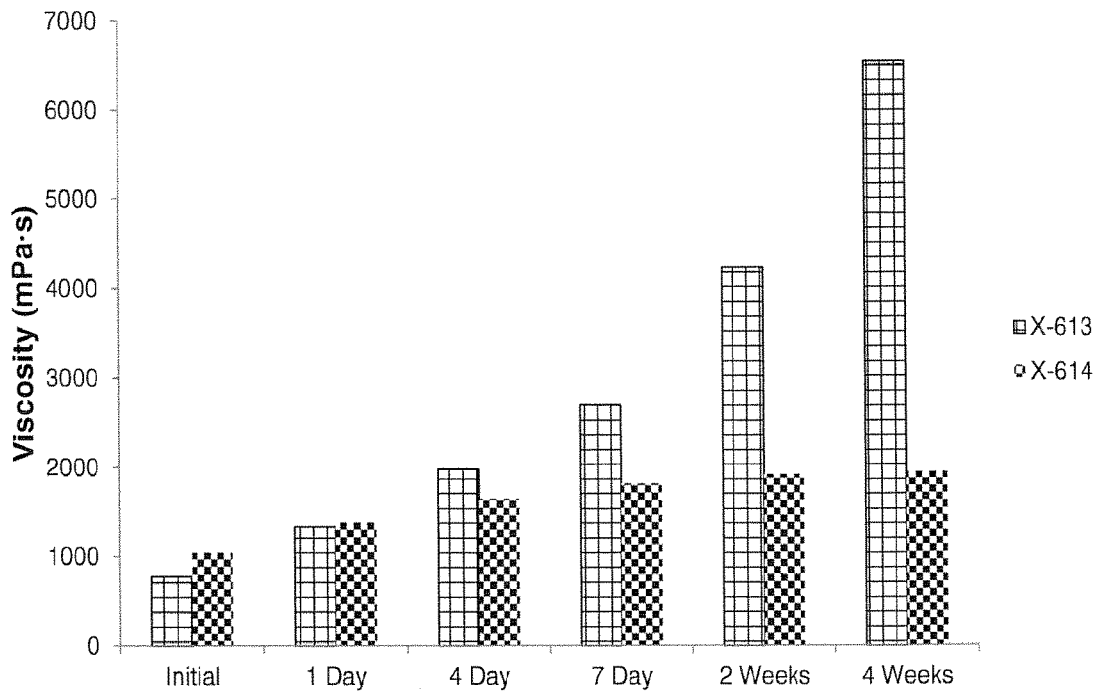
FIG. 1 -- Brookfield Viscosity Data
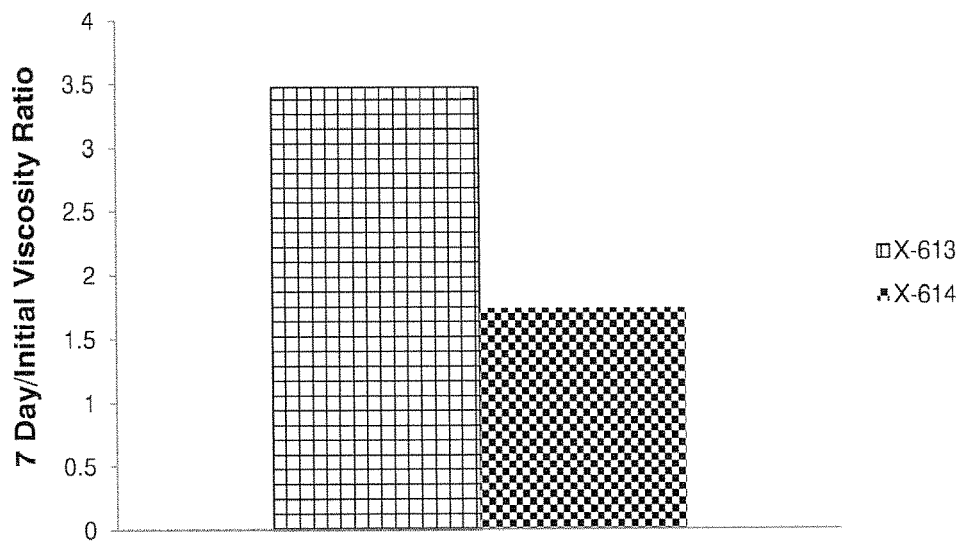
FIG. 2 -- Viscosity Aging - 7 Day/Initial Ratio

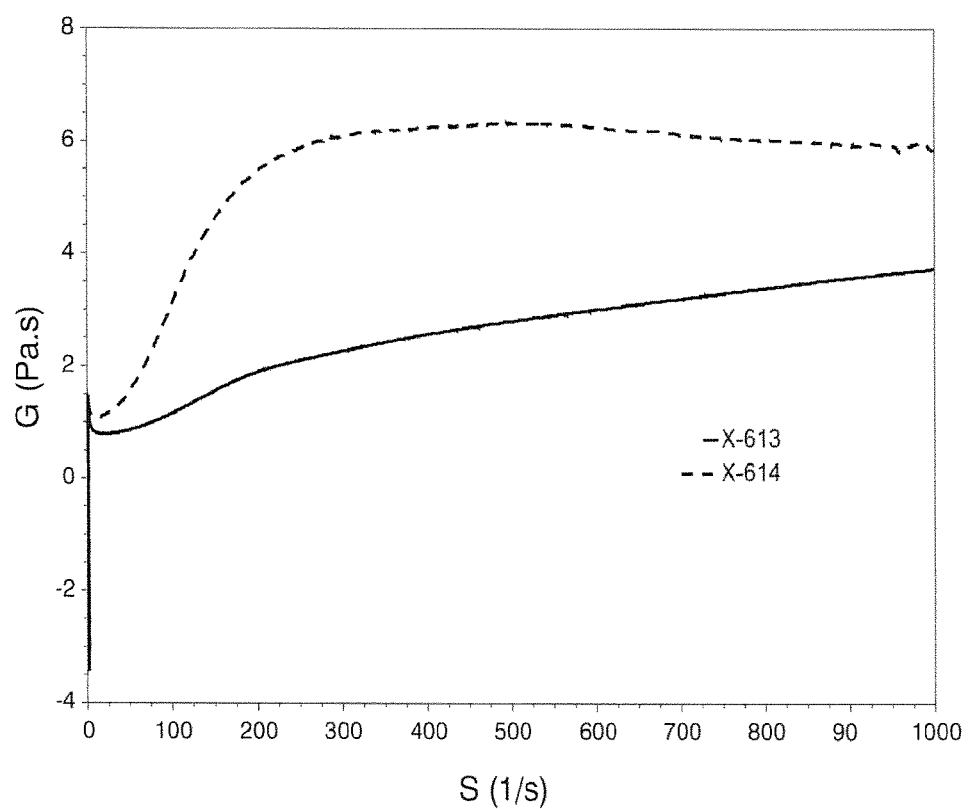
FIG. 3 -- Initial Shear Viscosity

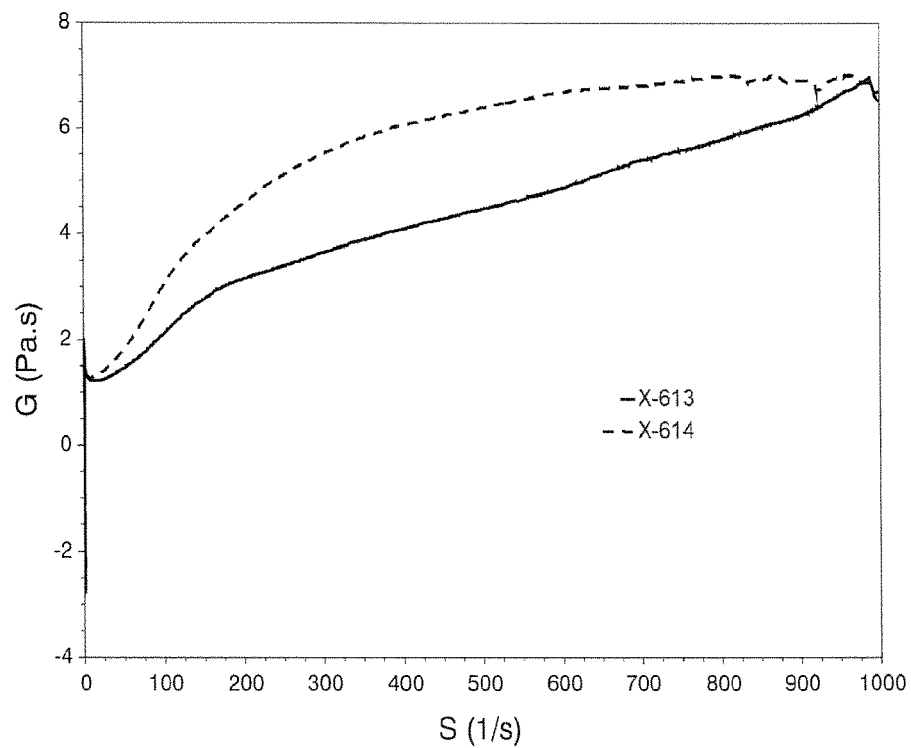
FIG. 4 -- 1-Day Shear Viscosity
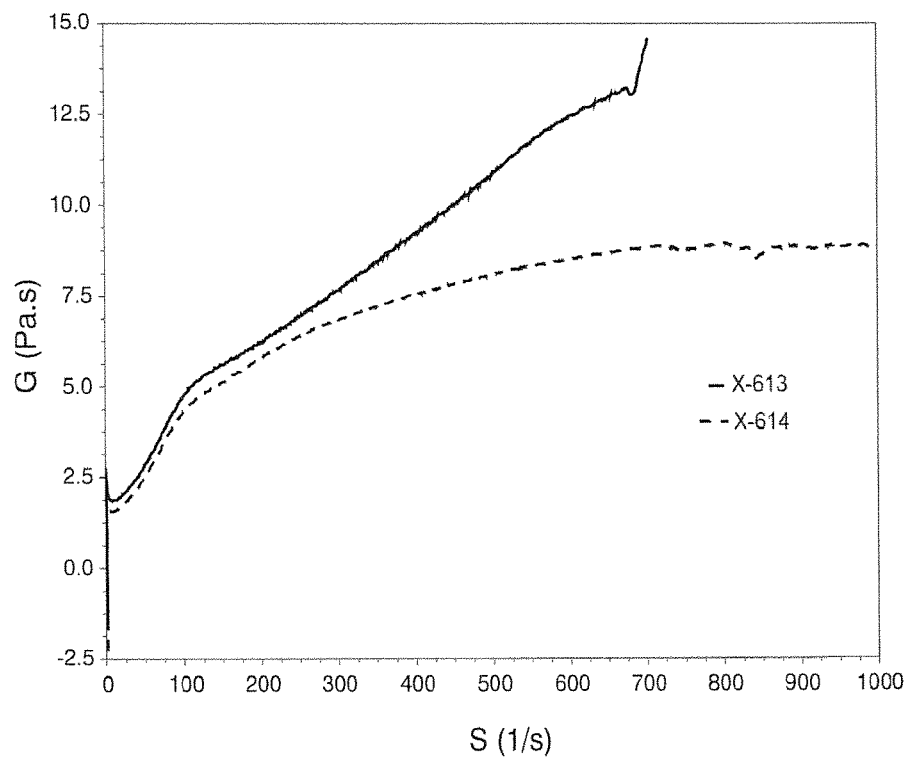
FIG. 5 -- 4-Day Shear Viscosity

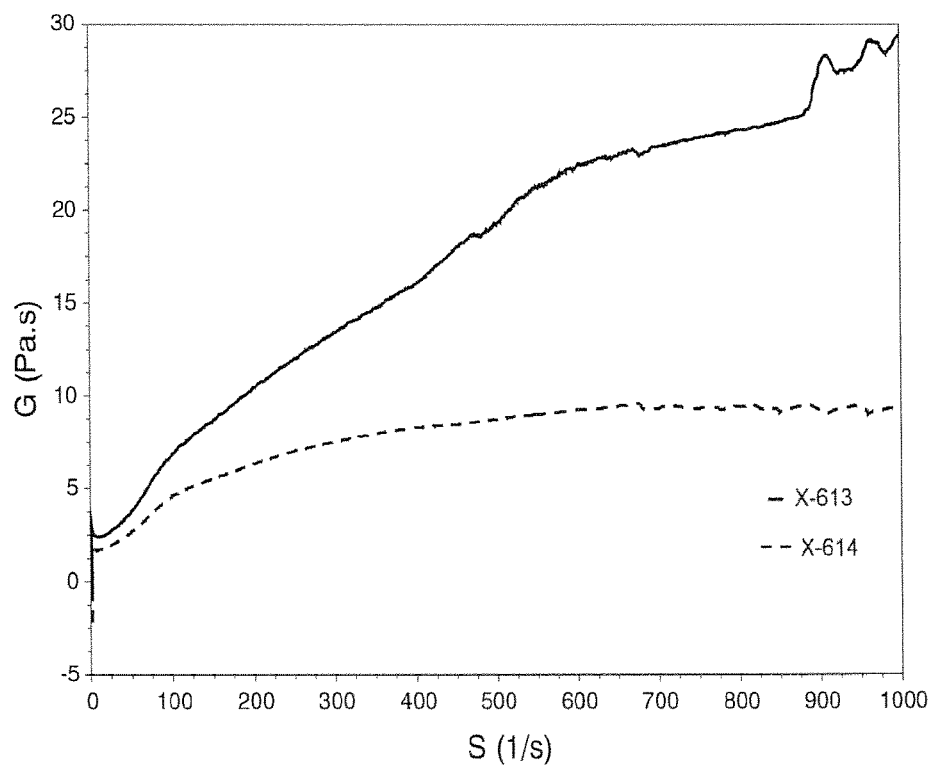
FIG. 6 -- 7-Day Shear Viscosity
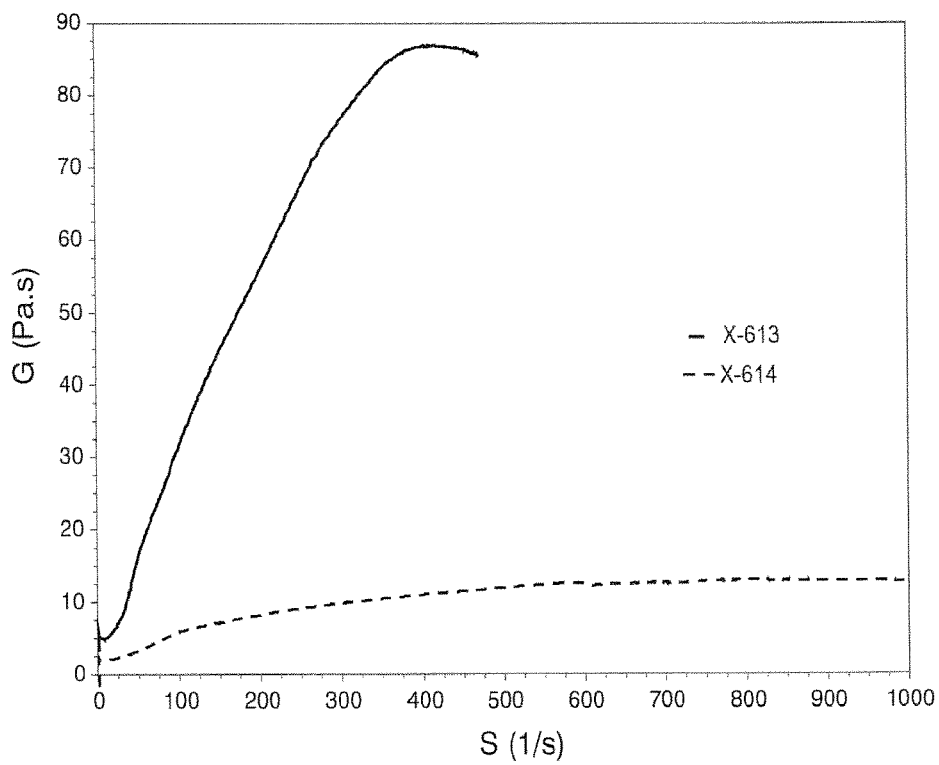
FIG. 7 -- 4-Week Shear Viscosity

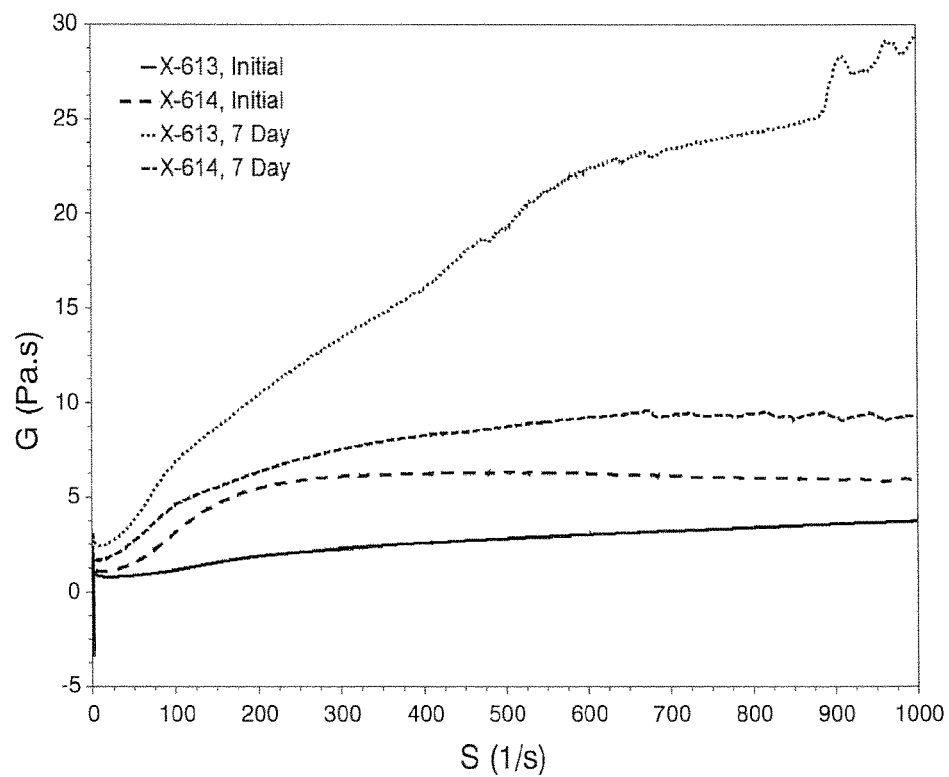
FIG. 8 -- Initial vs. 7-Day Shear
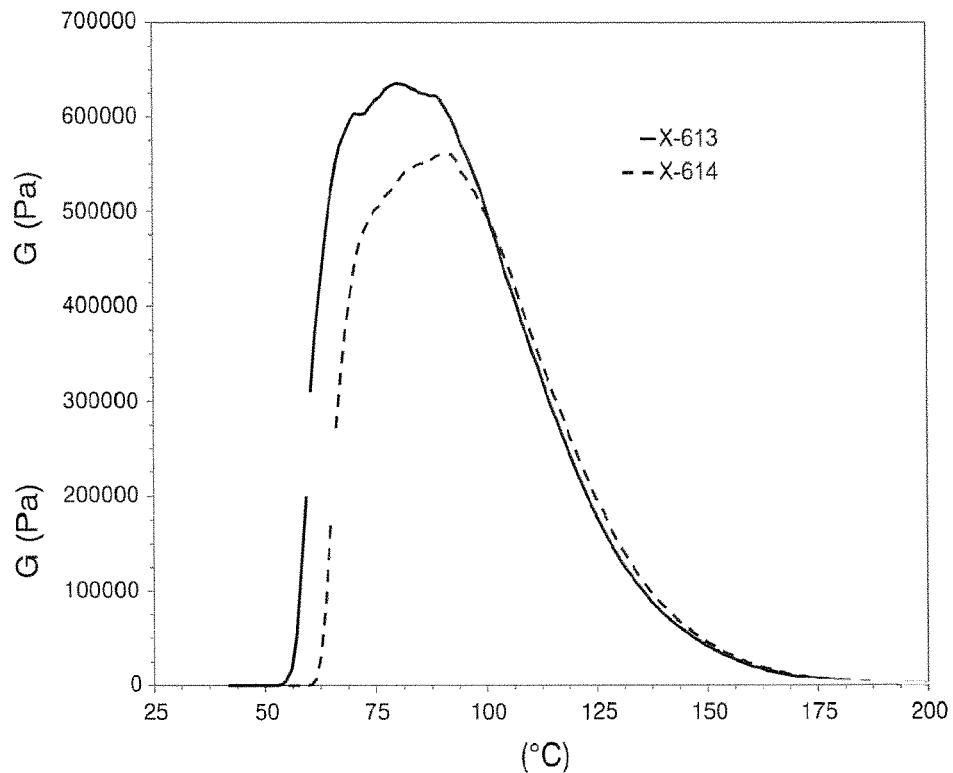
FIG. 9 -- Gel Fusion

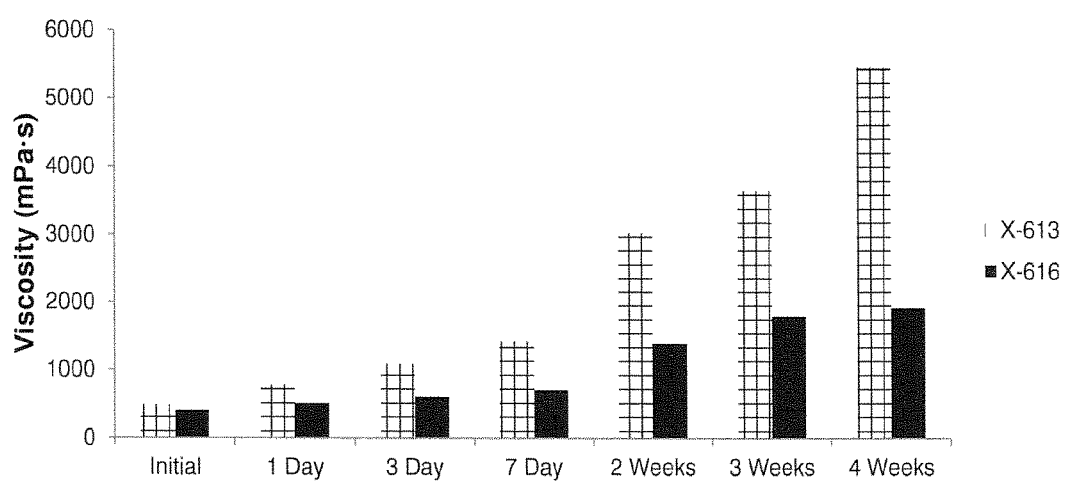
FIG. 10 -- Brookfield Viscosity Data

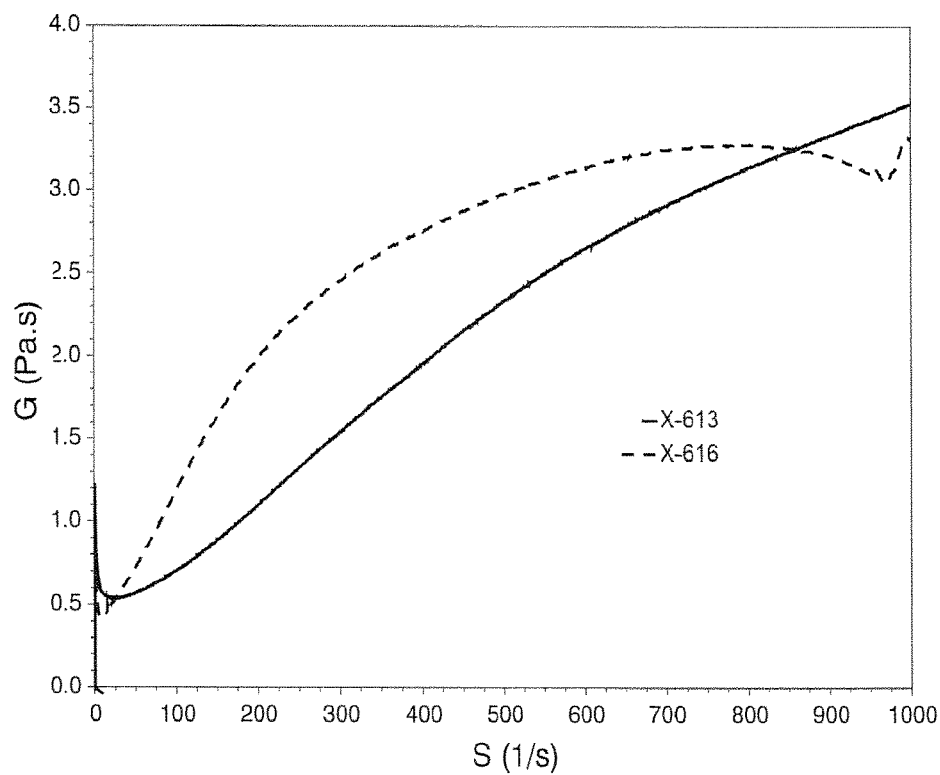
FIG. 11 -- Initial Shear Viscosity
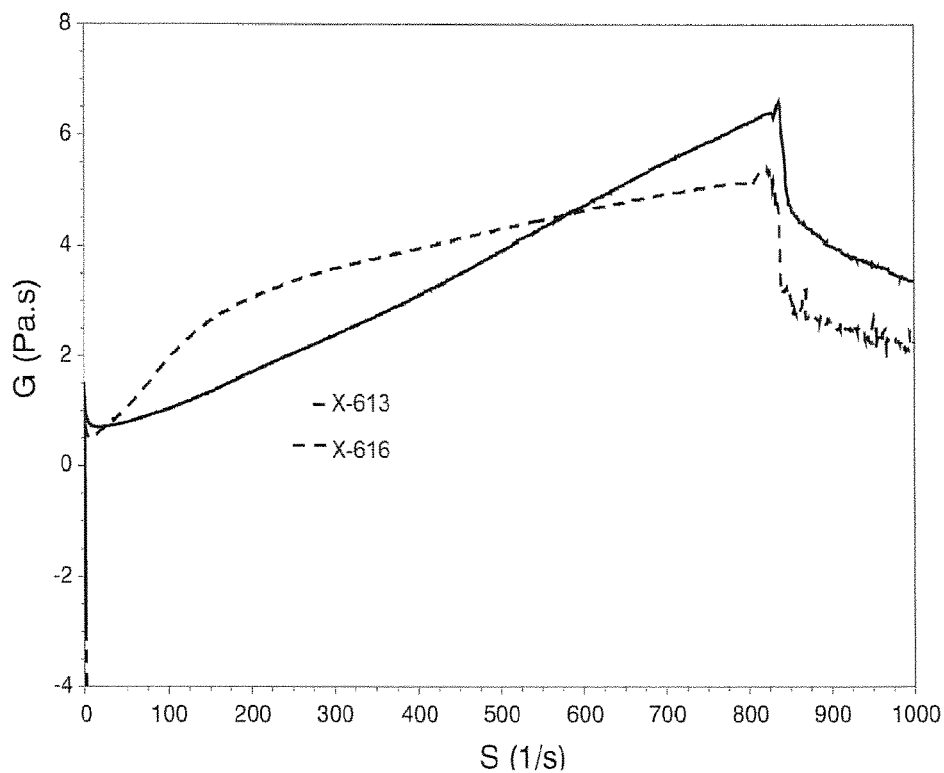
FIG. 12 -- 1-Day Shear Viscosity

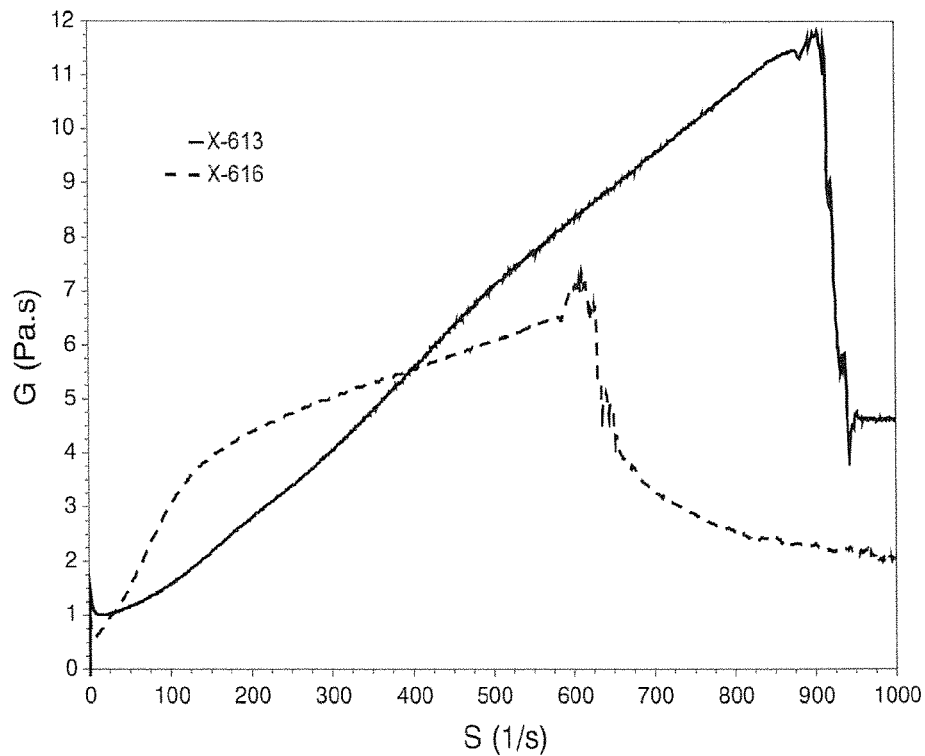
FIG. 13 -- 3-Day Shear Viscosity
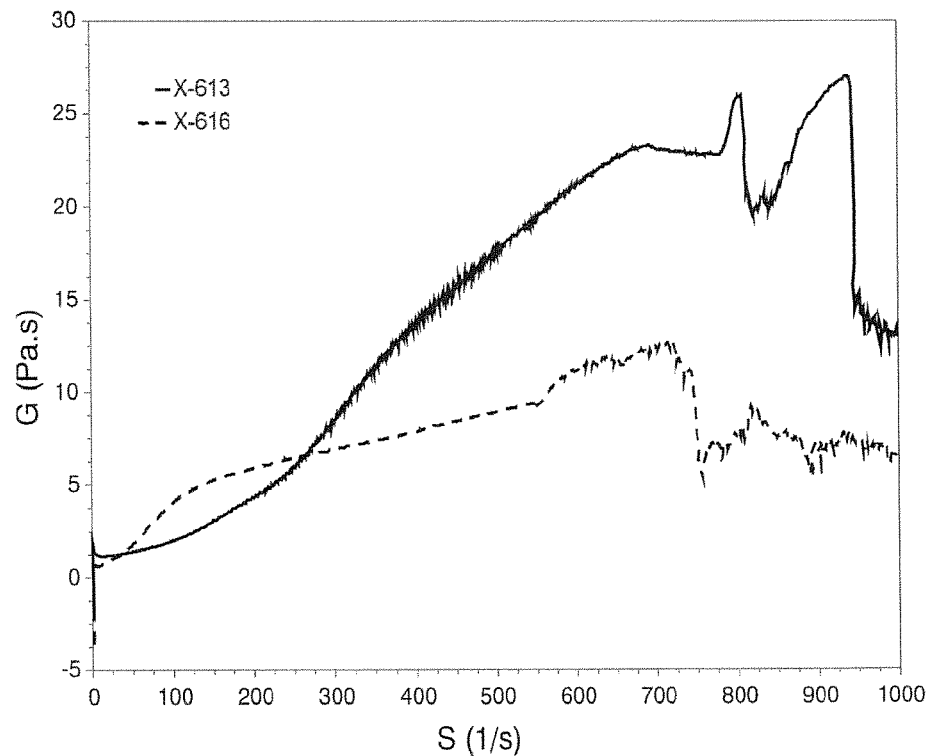
FIG. 14 -- 7-Day Shear Viscosity

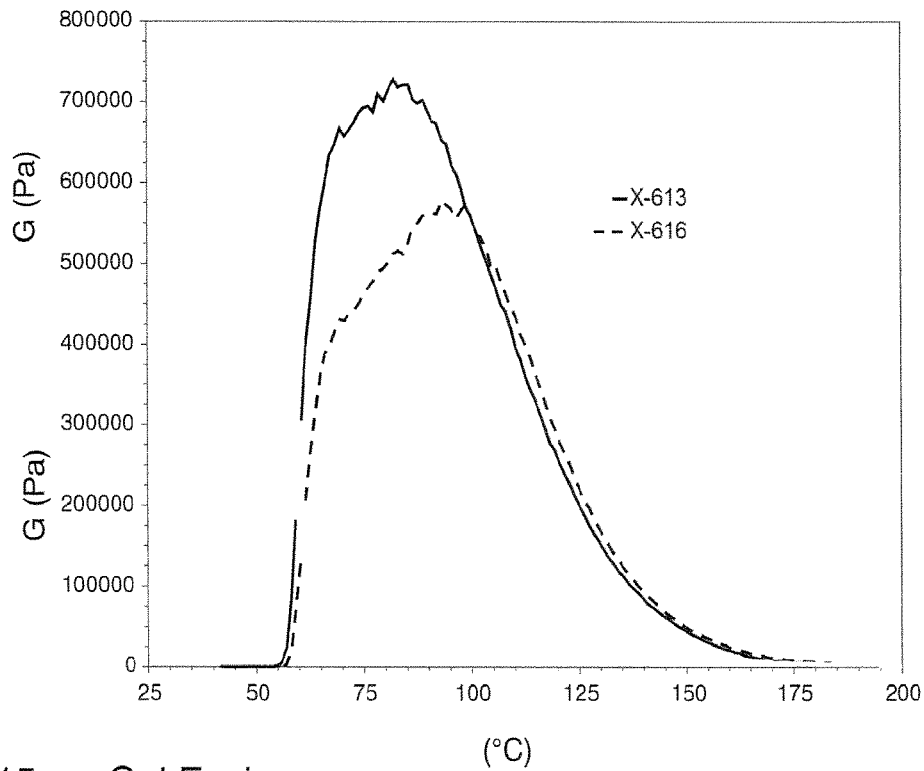
FIG. 15 -- Gel Fusion
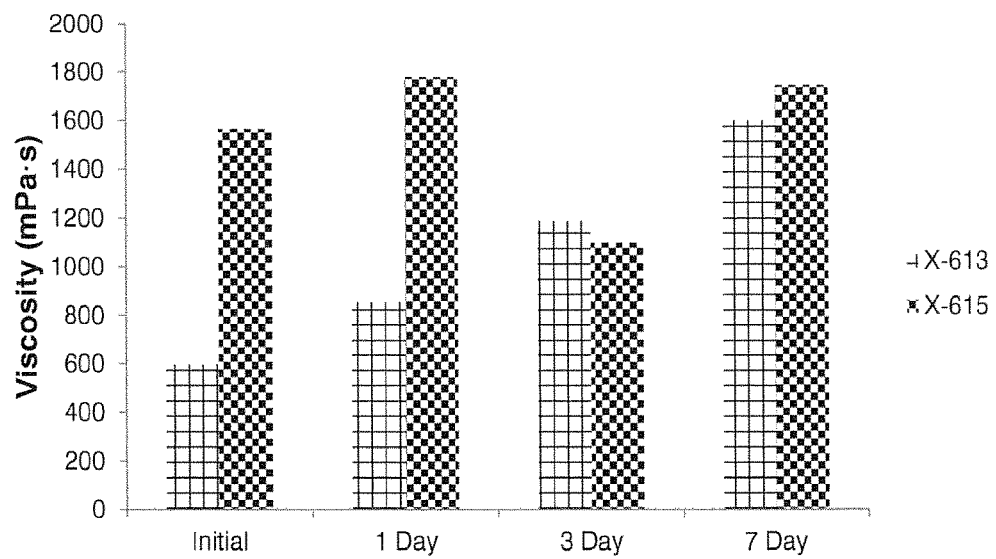
FIG. 16 -- Brookfield Viscosity Data

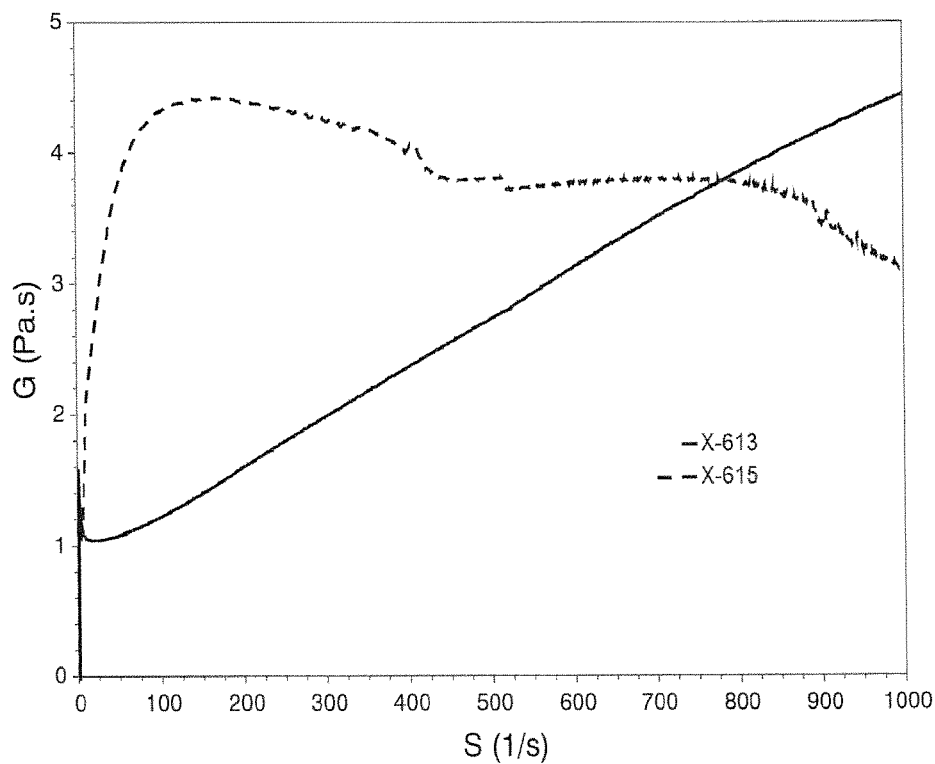
FIG. 17 -- Initial Shear Viscosity
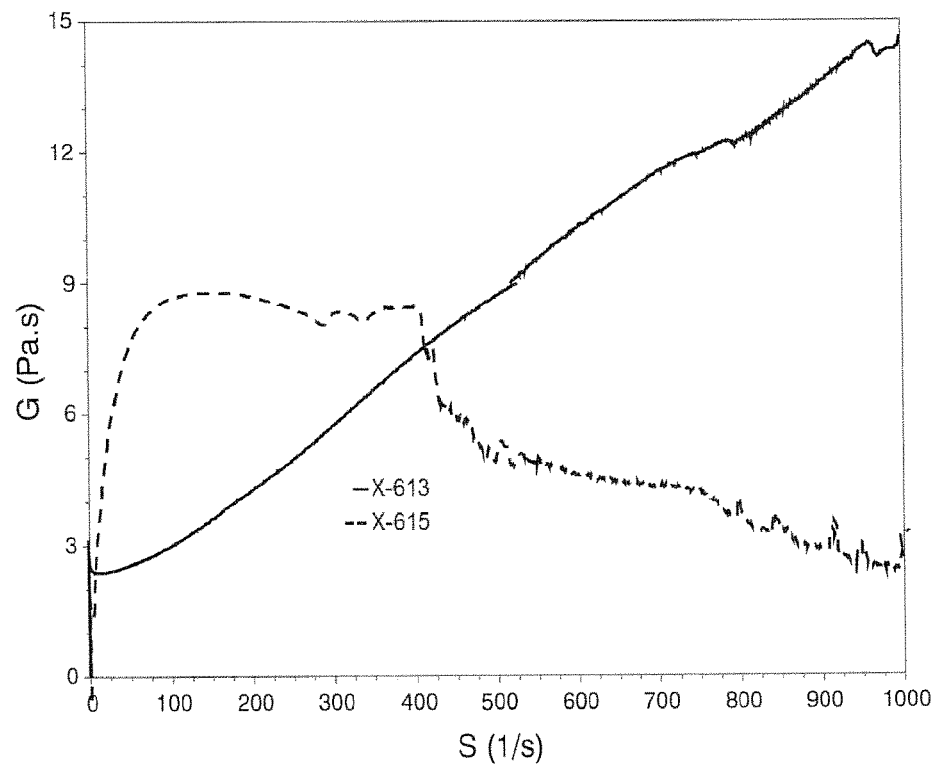
FIG. 18 -- 1-Day Shear Viscosity

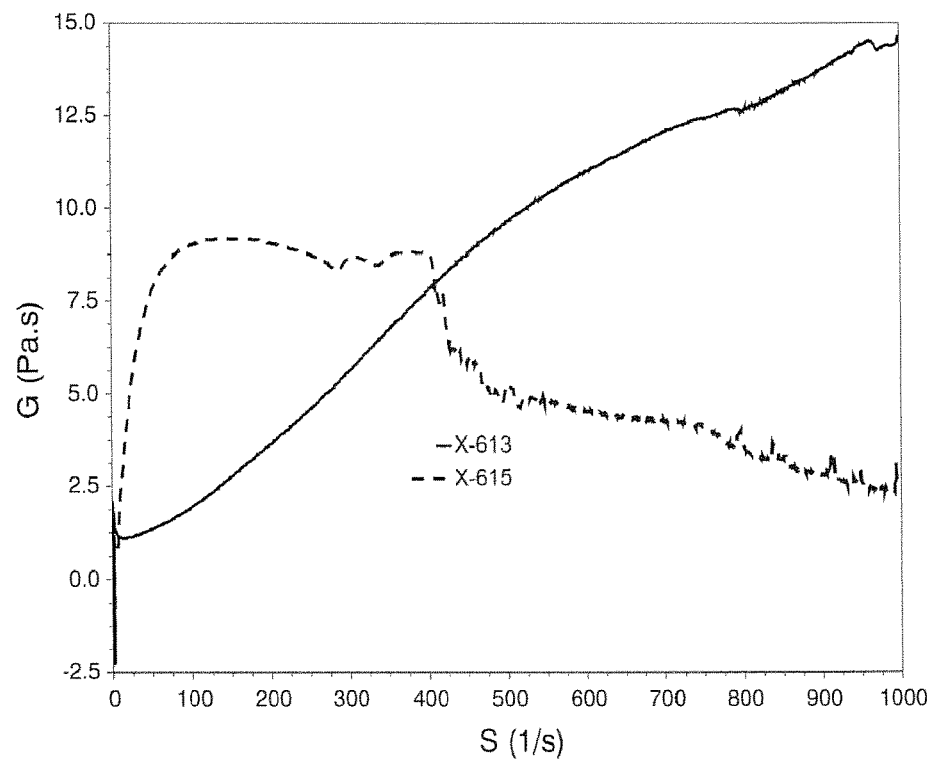
FIG. 19 -- 3-Day Shear Viscosity
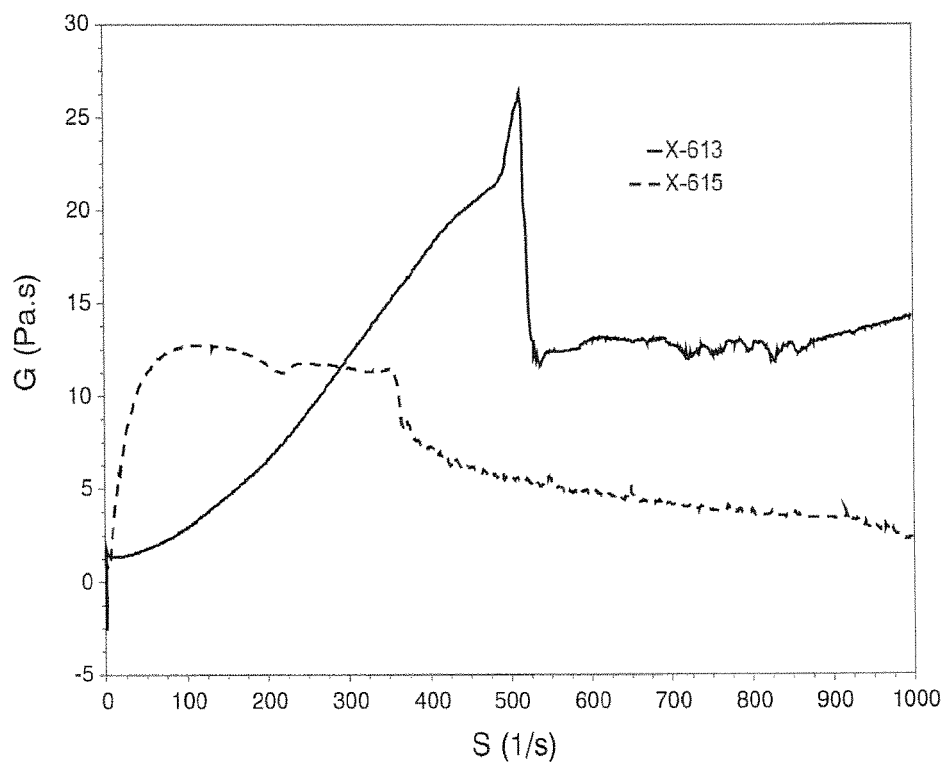
FIG. 20 -- 7-Day Shear Viscosity

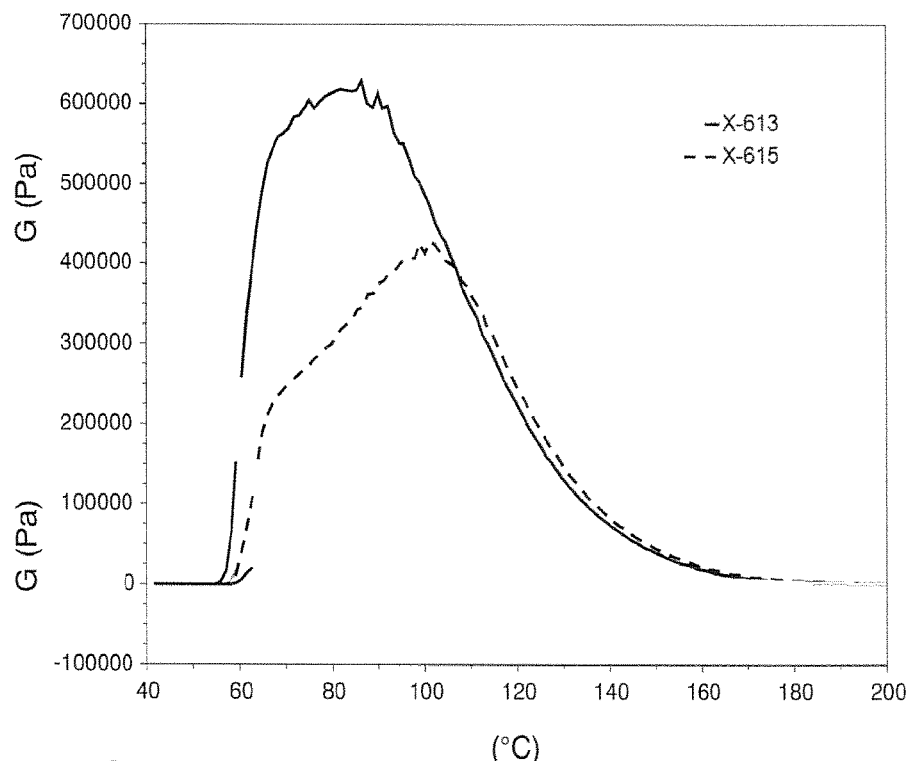
FIG. 21 -- Gel Fusion
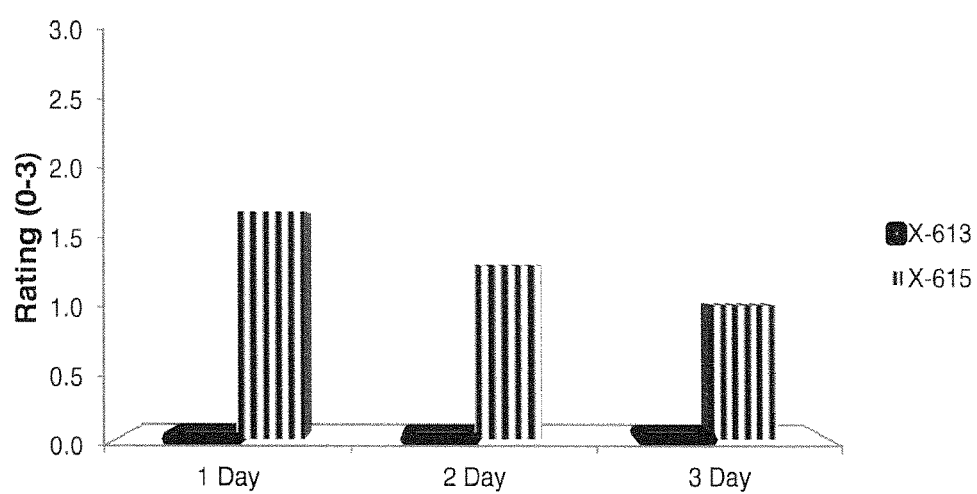
FIG. 22 -- Roll Compatibility Results

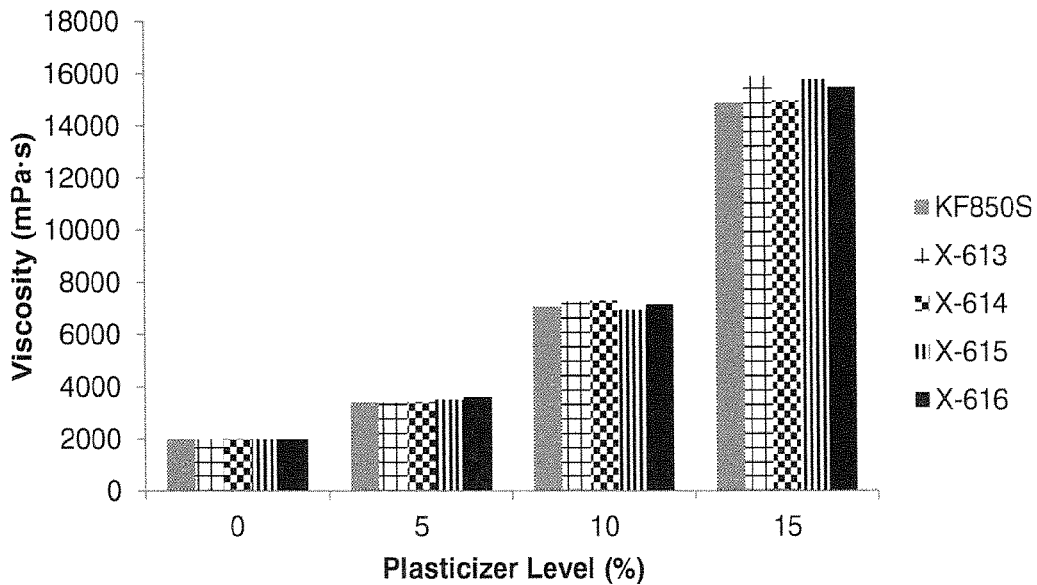
FIG. 23 -- Initial Viscosity Response - Copolymer
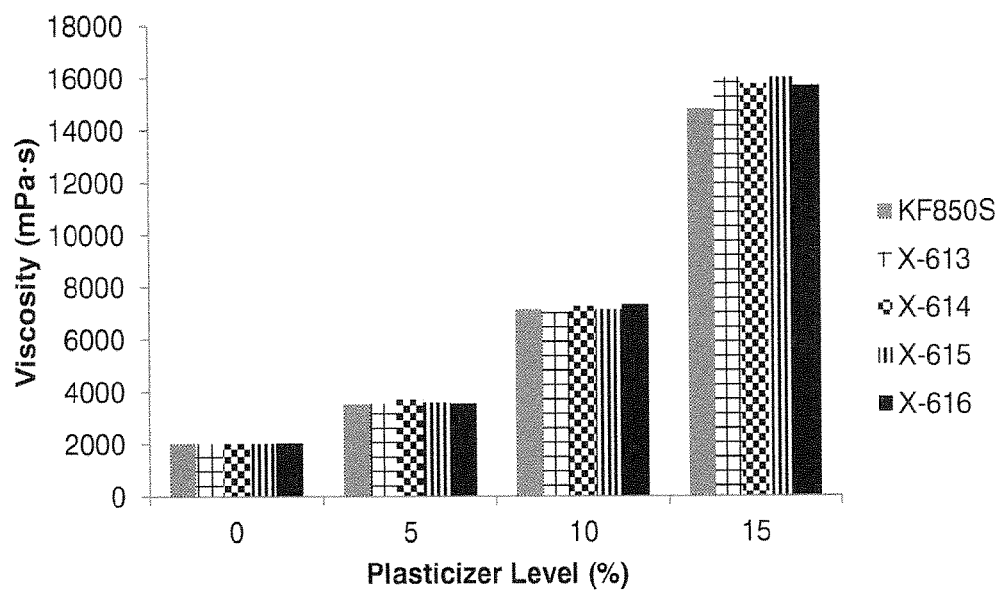
FIG. 24 -- 1-Day Viscosity Response - Copolymer

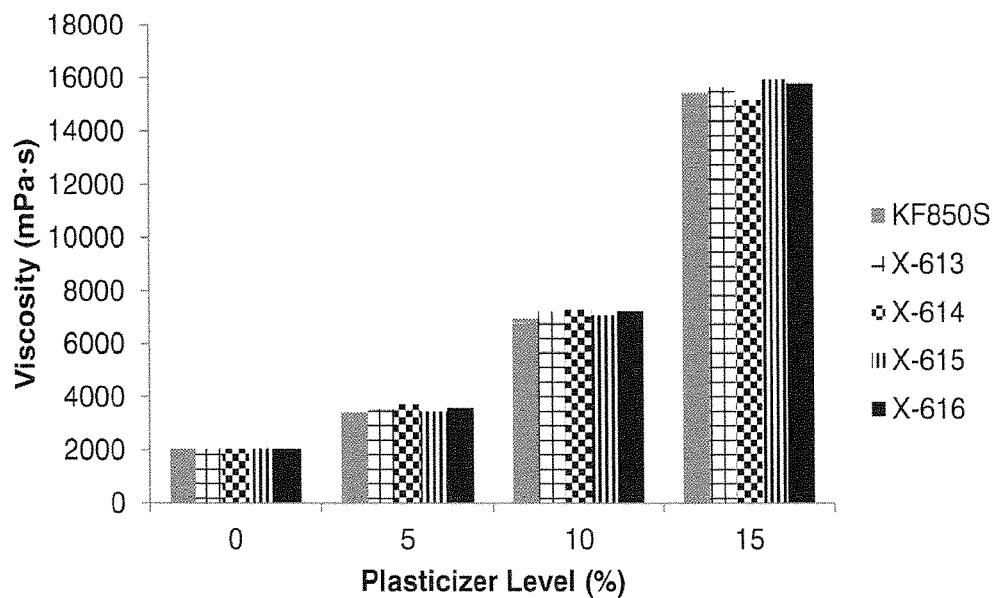
FIG. 25 -- 3-Day Viscosity Response - Copolymer
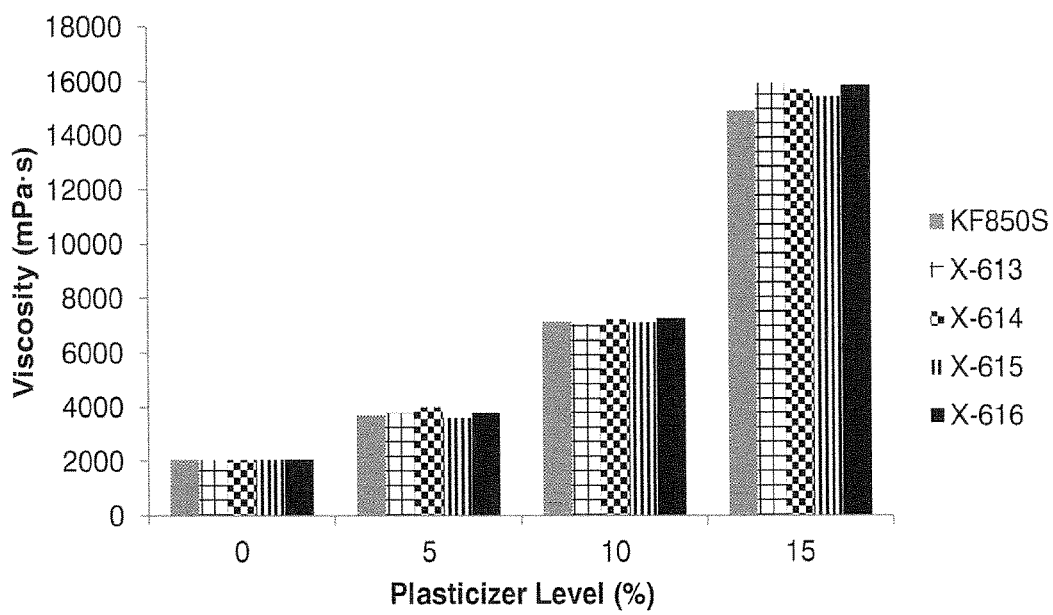
FIG. 26 -- 7-Day Viscosity Response - Copolymer

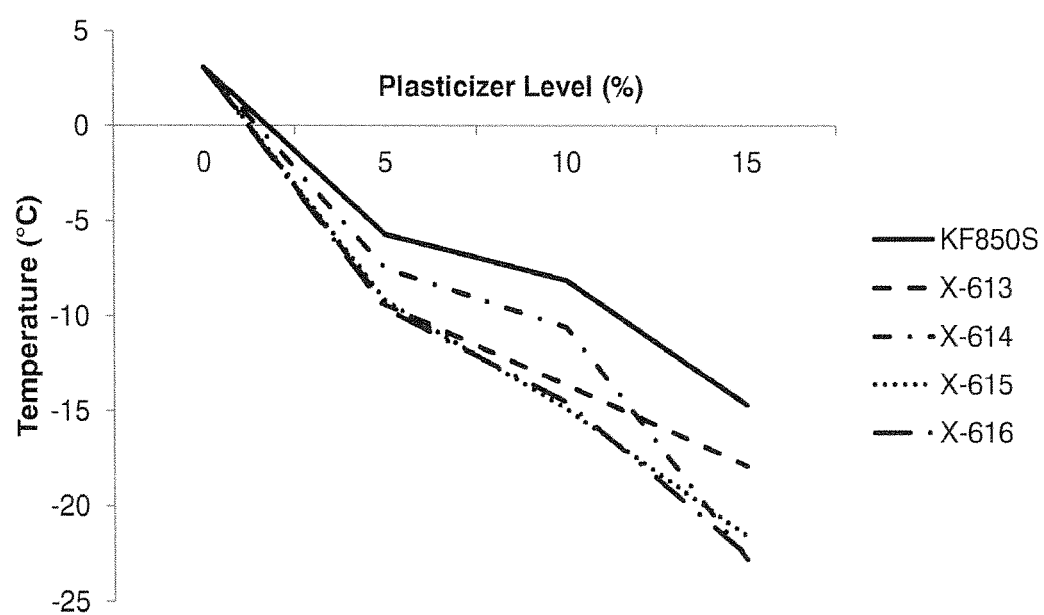
FIG. 27 -- Tg Suppression - Copolymer

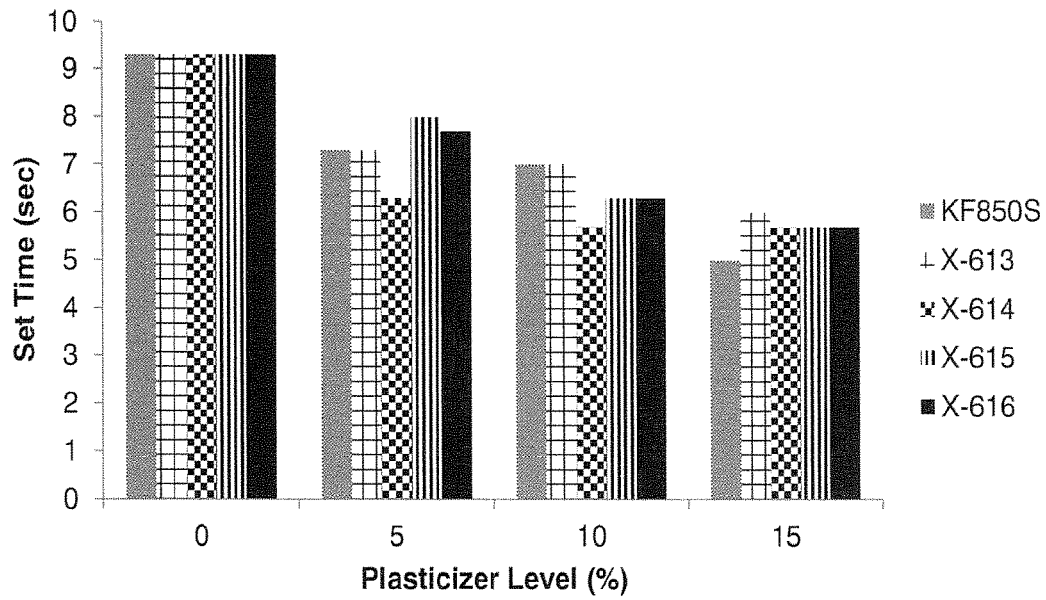
FIG. 28 -- Copolymer Set Times
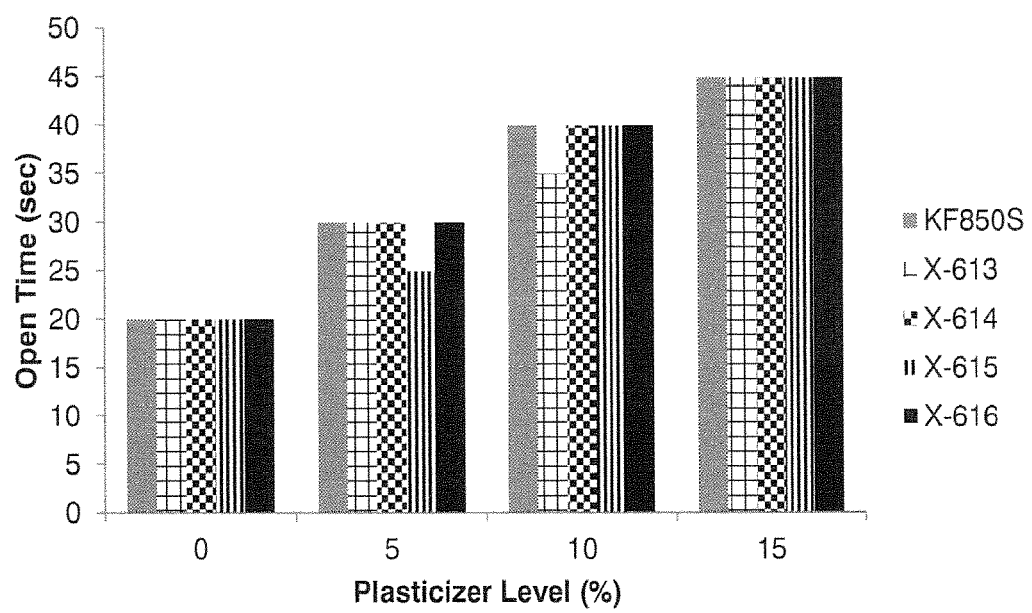
FIG. 29 -- Copolymer Open Times

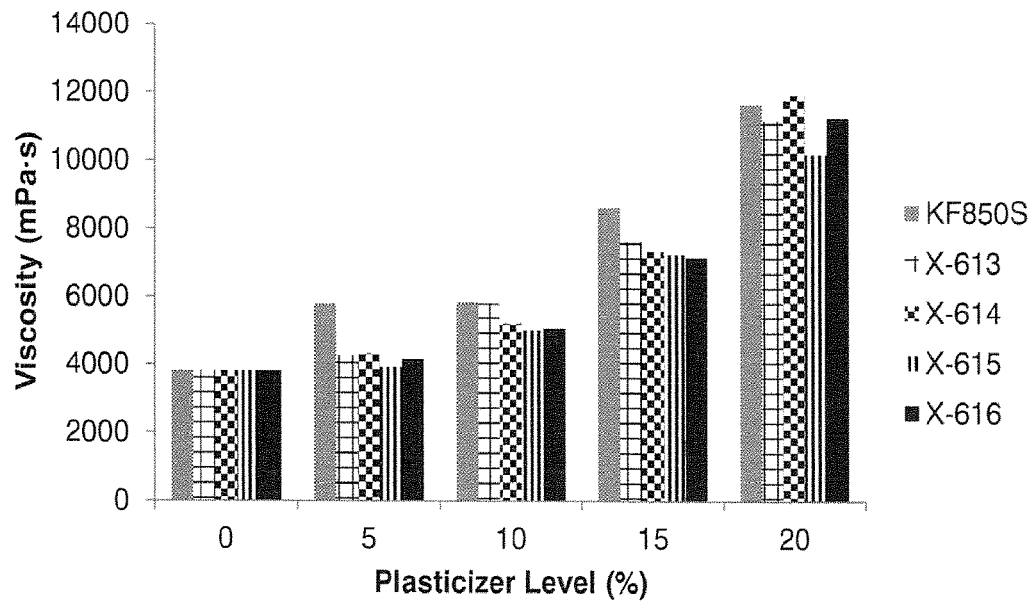
FIG. 30 -- Initial Viscosity Response - Homopolymer
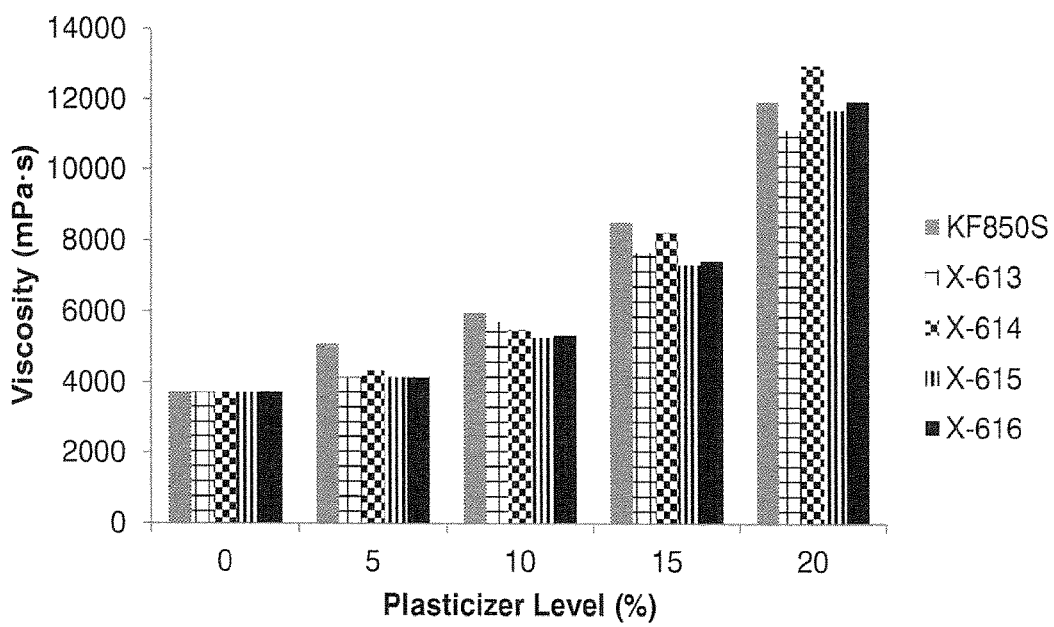
FIG. 31 -- 1-Day Viscosity Response - Homopolymer

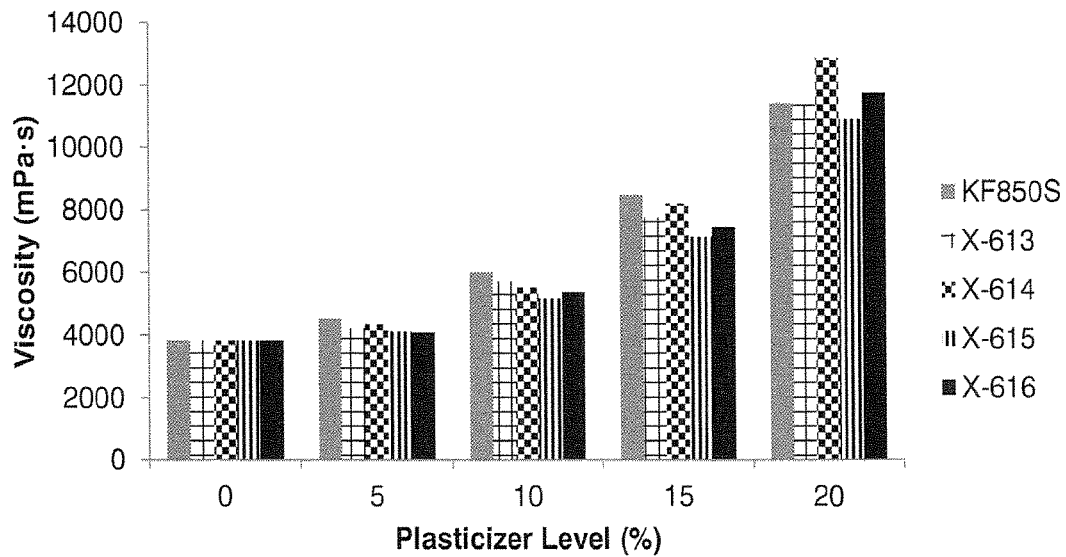
FIG. 32 -- 3-Day Viscosity Response - Homopolymer
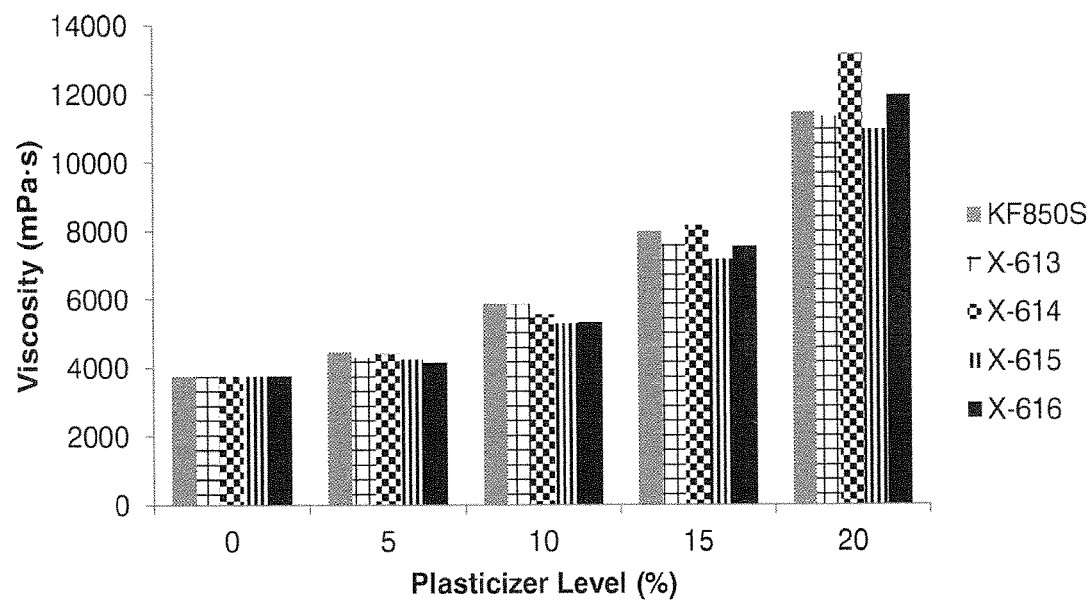
FIG. 33 -- 7-Day Viscosity Response - Homopolymer

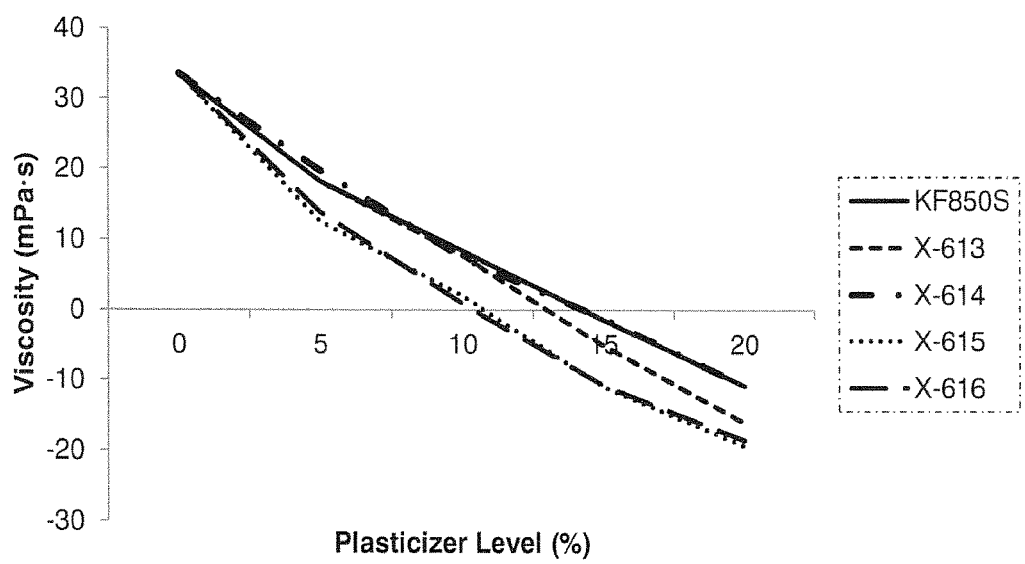
FIG. 34 -- Tg Suppression Homopolymer

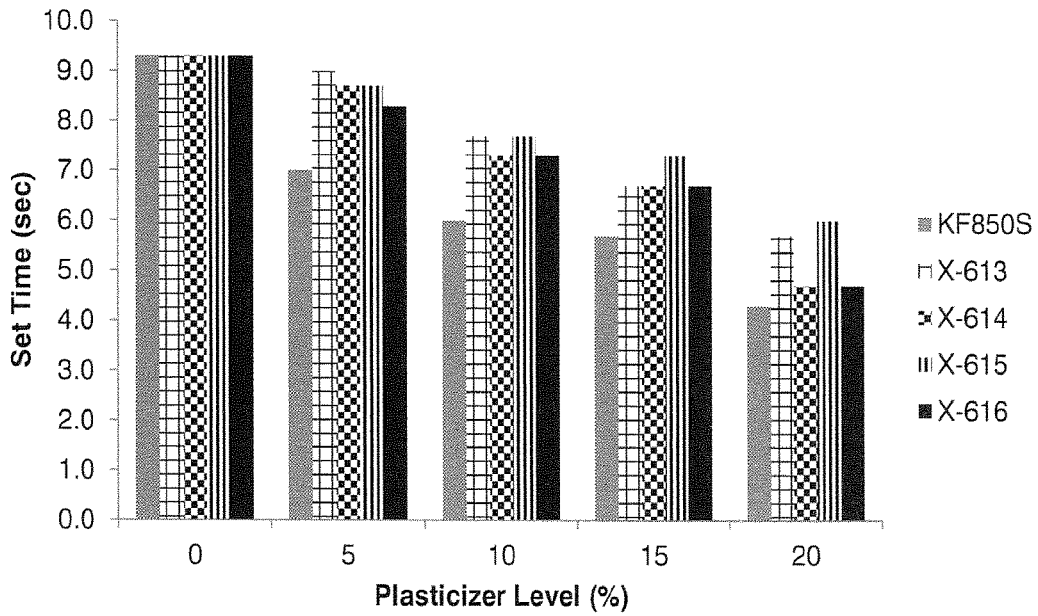
FIG. 35 -- Set Times - Homopolymer
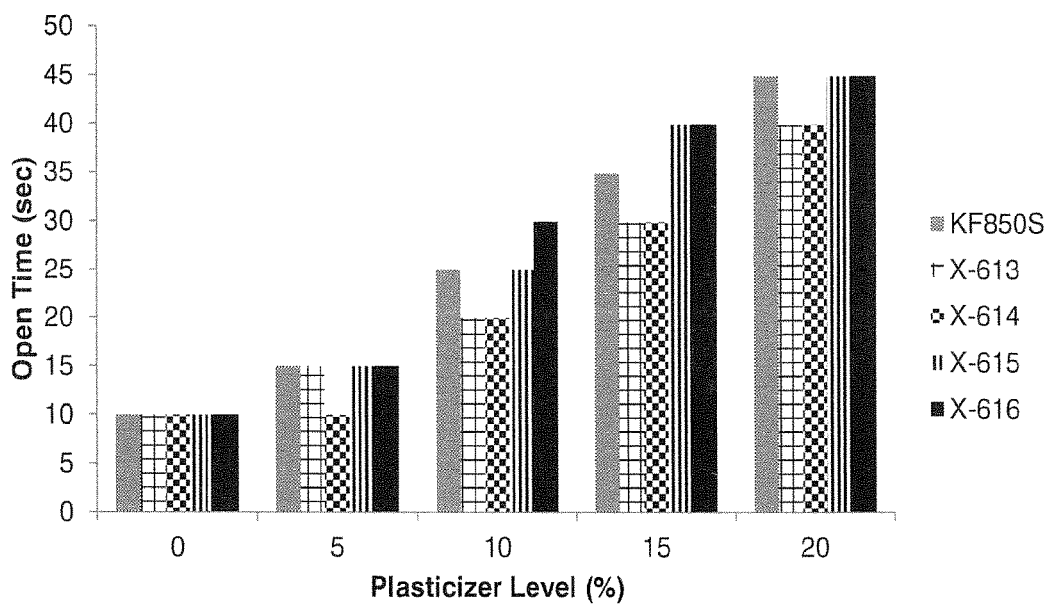
FIG. 36 -- Open Times - Homopolymer

MONOBENZOATE ANALOGS USEFUL AS PLASTICIZERS IN PLASTISOL COMPOSITIONS

FIELD OF THE INVENTION

This invention is directed to non-phthalate monobenzoate analogs, useful as plasticizers in a variety of polymer applications, including but not limited to plastisols, adhesives, caulks, architectural coatings, industrial coatings, OEM coatings, paints, inks, overprint varnishes ("OPV's"), other coatings, polishes and the like. In particular, this invention is directed to the use of analogs of a monobenzoate ester, 3-phenylpropyl benzoate, to improve the performance properties of polymers in plastisol applications. The inventive analogs have good processability, as demonstrated by their comparable or better rheology and solvating properties and improved viscosity stability, among other advantages, over traditional high solvating or specialty plasticizers used in plastisol applications. They also show unexpected improved performance over 3-phenylpropyl benzoate in similar applications, particularly with regard to viscosity stability. The invention is also directed to plastisol compositions comprising the inventive monobenzoate analogs and blends of the inventive monobenzoate analogs with other plasticizers for use in plastisol compositions.

BACKGROUND OF THE INVENTION

Plasticizers, as polymer additives, have been known for more than a century. Most high volume plasticizers have been developed in the last seventy years, primarily for use with vinyl and other polymeric substances. Plasticizers are used more than any other type of polymer additives, particularly in polyvinyl chloride (PVC) applications, such as plastisols; however, a wide variety of applications for plasticizer use are well known. Hundreds of plasticizers have been produced, but only a few remain having acceptable performance properties when combined with vinyl or other polymeric materials.

General purpose phthalates dominate the volume of plasticizers purchased every year and are most often selected for compounding flexible vinyl.

A typical plasticizer is defined as an organic liquid that will soften a polymer and make it more workable, as long as the polymer and plasticizer are at least partially compatible. Generally, plasticizers are used to adjust hardness (or softness) of a polymer, alter tensile properties (such as strength, elongation or flexibility) and to facilitate processability, as required, for a multitude of applications, including without limitation flexible vinyl applications.

Plasticizers serve as a vehicle for the dispersion of resin (polymer) particles, such as PVC in a plastisol. The dispersion is initially a two-phase, heterogeneous system. Plasticizers promote the formation of homogeneous systems and polymer fusion occurs upon heating. The higher the solvating power, the lower the temperature at which the system is fused, which, in turn, decreases the residence time and increases the speed at which polymeric compositions can be processed into an end product, resulting in a faster, more efficient and economical process.

In adhesives, plasticizers are used as additives to modify physical properties of the adhesive and the polymer film formed by the dried adhesive. Plasticizers facilitate the formation of an adhesive bond and prevent failure of the bond after aging. Plasticizers soften the polymer and add flexibility to the adhesive bond, without adversely affecting the degree of adhesion, lower the glass transition temperature (Tg) of the adhesive film making the polymer more flexible and the glue more efficient, and enhance film formation by lowering the minimum film formation temperature (MFFT).

In all applications, a plasticizer must be at least partially compatible with the base polymer. Compatibility is an important requirement for the selection of a plasticizer. Plasticizers should also possess chemical stability, low toxicity and low volatility. Finally, plasticizers should also be economically feasible.

Plasticizers are available in a wide variety of alternative chemistries and include: 1) general purpose, 2) specialty types and 3) secondary and diluent types, more fully described herein. Plasticizers are also distinguished based on their ability to solvate dispersed solid polymers and/or their gelation and fusion temperatures in plastisols. Gelation and fusion temperatures dictate the speed of production and are influenced by the solvating power of the plasticizer. By way of example only, the gelation and fusion temperatures of a plastisol containing a dibenzoate plasticizer will be lower than a plastisol containing a general purpose phthalate, thus enabling speed of processing in that particular application.

General purpose plasticizers provide an excellent compromise between performance characteristics and economy for most applications. Some examples include: bis (2-ethylhexyl phthalate) (DEHP or DOP), diisononyl phthalate (DINP), dioctyl phthalate (DnOP), diisodecyl phthalate (DIDP), dipropylheptyl phthalate (DPHP), di-2-ethylhexyl terephthalate (DOTP or DEHT), and diisononyl-1, 2 cyclohexane dicarboxylate (DIDC, BASF's Hexamoll® DINCH®).

Environmental scrutiny has led to the development of "next generation" general purpose non-phthalate plasticizers, such as DOTP and DIDC. Even though DOTP, chemically, is a phthalate, it is not an orthophthalate, the use of which is subject to increasing regulatory pressure. These "next generation" phthalate alternatives are viable; however, they do not always give the performance desired in vinyl compositions, particularly in plastisols (i.e., they have poorer compatibility resulting in slower speed, higher gel temperatures, lower gel strength). Blends of plasticizers can be used to adjust performance, although there may be some limits to this approach.

Some applications, however, require performance that cannot be achieved by use of a general purpose plasticizer alone. Applications that require better resistance to oils and solvents are one such example. General purpose phthalates are easily extracted by nonpolar solvents such as hexanes, such that alternative plasticizers would be a much better choice. There is also a need for plasticizers that are higher solvators for PVC and other polymer applications. These high solvators should also have a favorable rheology profile.

Specialty type plasticizers were developed, in part, to fulfill the need for high solvators, the most popular being lower molecular weight phthalates. An example of such a plasticizer is butyl benzyl phthalate (BBP), which is often employed as a high solvating plasticizer. Di-n-butyl phthalate (DBP) and diisobutyl phthalate (DIBP) are also useful high solvator, specialty type plasticizers. Examples of non-phthalate, high solvating plasticizers include dibenzoate esters, some citric acid esters, alkyl sulfonic acid esters, and certain phosphates. Dibutyl terephthalate (DBTP) and N-alkyl pyrrolidones have also been proposed as specialty type, high solvator plasticizers. Most high solvating plasticizers are limited in their usefulness due to high viscosity or poor rheology characteristics. An ideal plasticizer possesses a good balance between solvation and rheology characteristics.

Benzoate plasticizers include dibenzoates and monobenzoates, such as diethylene glycol dibenzoate (DEGDB) and dipropylene glycol dibenzoate (DPGDB) esters that have been used in a wide variety of polymer applications, including in the vinyl industry. DEGDB is an excellent plasticizer, but due to its high freeze point, blends with DPGDB were also developed to capitalize on the utility of DEGDB. Several years ago a blend of DEGDB, DPGDB and triethylene glycol dibenzoates (TEGDB) was introduced as a high solvating dibenzoate blend. More recently, a new dibenzoate triblend was introduced as a plasticizer/coalescent for use in plastisols, adhesives, architectural paint and coatings, and polishes, among other applications. This triblend, comprising DEGDB, DPGDB and 1, 2-propylene glycol dibenzoate (PGDB) in various ratios and sold as K-FLEX® 975P, has been found to be very versatile for a variety of applications, based on its broad range of compatibilities with polymers. The triblend possesses good solvating properties for polyvinyl chloride applications. Its performance properties compare favorably to traditional high solvating phthalate plasticizers as well as traditional benzoate ester plasticizers. Suitable applications include: plastisols, including without limitation PVC and acrylic-based plastisols; adhesives, including without limitation polyvinyl acetate and vinyl acetate ethylene; caulks and sealants, including without limitation polysulfides); and coatings, including without limitation vinyl acrylic, acrylic and styrene acrylic types.

Monobenzoate esters known to be useful as plasticizers include: isodecyl benzoate, isononyl benzoate, and 2-ethylhexyl benzoate. For example, isodecyl benzoate has been described as a useful coalescent for paint compositions and for use in the preparation of plastisols in U.S. Pat. No. 5,236,987 to Arendt. The use of isodecyl benzoate has also been described in U.S. Pat. No. 7,629,413 to Godwin et al. as a useful secondary plasticizer in combination with phthalate plasticizers to provide lower viscosity and lower volatility in PVC plastisols. The use of 2-ethylhexyl benzoate in a blend with DEGDB and diethylene glycol monobenzoate is described in U.S. Pat. No. 6,689,830 to Arendt et al. The use of isononyl esters of benzoic acid as film-forming agents in compositions such as emulsion paints, mortars, plasters, adhesives, and varnishes is described in U.S. Pat. No. 7,638,568 to Grass et al. More recently, as described in WO 2013/123127, WO 2013/123149, and WO 2013/123188, it has been discovered that the monobenzoate, 3-phenylpropyl benzoate (3-PPB), which had not heretofore been used in polymeric applications of the type discussed herein, is a surprisingly effective plasticizer alone or in blends for polymeric applications.

"Half ester" monobenzoates include dipropylene glycol monobenzoate and diethylene glycol monobenzoate, which are byproducts of the production of dibenzoates, but which, most of the time, are not objects of production. Half esters are not known for being high solvators, although they may be used in conjunction therewith. Half esters are also not as useful in PVC as dibenzoate plasticizers, because they are less compatible than the corresponding dibenzoate with PVC. However, the half esters are compatible with emulsions polymers, such as acrylic and/or vinyl ester polymers.

Examples of secondary and diluent type plasticizers, used primarily to reduce plastisol viscosity, include those based on castor oil and soybean oil. Isodecyl benzoate, a monobenzoate, is also a useful diluent type plasticizer.

All of the high solvator plasticizers (regardless of type) add value to vinyl compositions that traditional general purpose plasticizers cannot. Traditional general purpose plasticizers have good rheology profiles and are compatible with many polymers, but have poor solvating ability. Moreover, many of the high solvator plasticizers are phthalates, for which safer alternatives are being sought.

There remains a need for non-phthalate, low VOC plasticizers for use in polymeric applications, such as plastisols, adhesives, paints and other coatings, as alternatives to traditional primary and secondary diluent plasticizers. These alternatives should be compatible with a wide variety of polymers and have lower VOC content and comparable or better performance properties, when used in polymer applications, such as vinyl, traditionally requiring plasticizers. Non-phthalate, low VOC alternatives are particularly desirable in view of environmental, health and safety issues associated with many of the traditional diluent type plasticizers.

It has been discovered that certain analogs of 3-PPB are surprisingly effective plasticizer alternatives for use in polymeric applications, including but not limited to plastisols, paints and other coatings, adhesives, OPV's and inks, and provide improved performance over 3-PPB alone. These analogs are derived from alcohols not traditionally used in industrial applications, but rather in the flavor and fragrance field. Advantages of these monobenzoate analogs versus conventional plasticizers are their performance and handling properties, which are better than most dibenzoates and monobenzoates previously used, including comparable or better viscosity, rheology and solvating properties, improved viscosity stability over time and lower cost. A significant, unexpected advantage is gained in viscosity control, with no sacrifice of solvating properties, as compared to traditional plasticizers, including the benzoates.

The monobenzoate analogs of the invention include compounds that are structurally similar to 3-PPB. One of the inventive monobenzoate analogs, 2-methyl-3-phenylpropyl benzoate (HMCA benzoate) is not commercially available and has not been used in polymeric applications of the type discussed herein. Other inventive analogs include 2-phenylethyl 2-phenylacetate, commonly used in the fragrance industry, benzyl 3-phenylpropanoate, and benzyl 2-methyl-3-phenylpropanoate. None of these analogs have been used in polymeric applications of the type herein described.

While this invention is focused on the use of the inventive analogs as plasticizers in plastisol compositions and adhesives, other applications include a variety of coatings, including without limitation overprint varnishes, polishes, inks, paints, sealants, and caulk. In addition, the inventive analogs are useful as secondary plasticizers or diluents when blended with other traditional plasticizers.

It is an object of the invention to provide plasticizers having excellent compatibility with a wide variety of polymers and other plasticizers, lower VOC content than traditional diluent type plasticizers used to control plastisol viscosities, and improved viscosity stability, for use alone or in blends with other plasticizers, in plastisols and other polymeric applications where plasticizers are traditionally required and used.

It is a further object of the invention to provide non-phthalate alternative plasticizers for use as a primary or secondary plasticizer in PVC applications.

It is also an object of the invention to provide alternative, non-phthalate plasticizers having excellent compatibility with a wide variety of polymers, with improved handling and a superior toxicological profile over traditional plasticizers, for use alone or in combination with other plasticizers in adhesive applications.

Another object of the invention is to provide alternative, non-phthalate plasticizers for use in adhesives, which achieve comparable or better performance properties over traditional plasticizers, including but not limited to viscosity response, Tg suppression, set time, and open times, minimum film formation temperature (MFFT), among other properties.

Still another object of the invention is to provide plastisols, waterborne or non-aqueous adhesive compositions, and other polymeric compositions comprising the inventive monobenzoate analogs, which have comparable or better properties than compositions utilizing traditional plasticizers.

Yet another object of the invention is to provide non-phthalate plasticizers that have high solvating properties and/or good rheology profiles, which are useful as specialty blending plasticizers to improve the compatibility and processability of poor solvating plasticizers, while minimizing the attendant disadvantages of high viscosity and poor rheology associated with the use of traditional high solvating plasticizers.

Still a further object of the invention is to provide plasticizer blends comprising the inventive monobenzoate analogs of the invention.

Finally, another object of the invention is to provide a plastisol formulation utilizing the inventive non-phthalate plasticizers, which allows faster processing and economic efficiencies to be achieved and provides comparable or better tensile strength properties over traditional diluent type plasticizers.

Other objects of the invention will be apparent from the description herein.

SUMMARY OF THE INVENTION

This invention is directed to the use of a non-phthalate monobenzoate analogs of 3-PPB as plasticizers for polymeric dispersions, such as plastisols. These inventive monobenzoate analogs include: HMCA benzoate, 2-phenylethyl 2-phenylacetate, benzyl 3-phenylpropanoate and benzyl 2-methyl-3-phenylpropanoate. These inventive components were not previously known or used in industrial applications or as plasticizers for plastisol or adhesive compositions.

In one embodiment, the invention is a plasticizer comprising HMCA benzoate, 2-phenylethyl 2-phenylacetate, benzyl 3-phenylpropanoate, or benzyl 2-methyl-3-phenylpropanoate that provide improved solvation and rheology and improved viscosity stability over traditional plasticizers, when used in polymeric applications such as plastisols, among others.

In a second embodiment, the invention is a plastisol composition comprising the inventive monobenzoate analogs, including, but not limited to, PVC and acrylics.

In a third embodiment, the invention is a waterborne adhesive composition comprising the inventive plasticizer, including but not limited to waterborne latex glues and waterborne acrylics.

In a fourth embodiment, the invention is a caulk composition comprising the inventive plasticizer.

In a fifth embodiment, the invention is a sealant composition comprising the inventive plasticizer.

In a sixth embodiment, the invention is a non-aqueous based adhesive composition comprising the inventive plasticizer.

In a seventh embodiment, the invention is a blend of the inventive monobenzoate analogs with traditional liquid and solid plasticizers, as further identified herein, to improve their solvating characteristics and facilitate their compatibilization with a polymer. The inventive analogs are thought to be particularly useful with DOTP and 1,2-cyclohexane dicarboxylate esters (Hexamoll® DINCH®).

In still other embodiments, the invention relates to the use of the inventive plasticizers in compositions used in applications such as resilient flooring, toys, gloves, wall covering, leather, textiles, adhesives, sealants, paints, and other coatings and the like.

The inventive analog plasticizers show significant advantages over other diluent plasticizers. In particular, use of the inventive plasticizers in the same or similar amounts as traditional plasticizers results in a lower VOC content compared to other diluent plasticizers, such as 2,2,4-trimethyl-1,3-pentanediol diisobutyrate or isodecyl benzoate. They also demonstrate comparable or better performance and handling properties and improved viscosity over time than that achieved with traditional primary and secondary plasticizers. To the extent the inventive analog plasticizers have past and continued use as a flavor and fragrance additives, they may have fewer environmental, health and safety issues associated when compared with some of the other traditional plasticizers.

BRIEF DESCRIPTION OF THE DRAWINGS

FIG. 1 shows initial, 1-day, 4-day, 7-day, 2-week and 4-week Brookfield viscosity data obtained for the inventive monobenzoate analog, HMCA benzoate (X-614), as compared to 3-PPB (X-613).

FIG. 2 shows viscosity aging in terms of the 7 day/Initial Viscosity Ratio for HMCA benzoate and 3-PPB.

FIG. 3 shows initial shear data for two plastisols, one comprising HMCA benzoate and the other 3-PPB.

FIG. 4 shows 1-day shear data for two plastisols, one comprising HMCA benzoate and the other 3-PPB.

FIG. 5 shows 4-day shear data for two plastisols, one comprising HMCA benzoate and the other 3-PPB.

FIG. 6 shows 7-day shear data for two plastisols, one comprising HMCA benzoate and the other 3-PPB.

FIG. 7 shows 4-week shear data for two plastisols, one comprising HMCA benzoate and the other 3-PPB.

FIG. 8 shows a comparison of the initial shear data versus the 7-day shear data for two plastisols, one comprising HMCA benzoate and the other 3-PPB.

FIG. 9 shows gel/fusion curves for two plastisols, one comprising HMCA benzoate and the other 3-PPB.

FIG. 10 shows a comparison of the initial, 1-day, 3-day, and 7-day Brookfield viscosities for the inventive monobenzoate analog, 2-phenylethyl 2-phenylacetate (X-616), and 3-PPB (X-613).

FIG. 11 shows initial shear data for two plastisols, one comprising 2-phenylethyl 2-phenylacetate and the other 3-PPB.

FIG. 12 shows 1-day shear data for two plastisols, one comprising 2-phenylethyl 2-phenylacetate and the other 3-PPB.

FIG. 13 shows 3-day shear data for two plastisols, one comprising 2-phenylethyl 2-phenylacetate and the other 3-PPB.

FIG. 14 shows 7-day shear data for two plastisols, one comprising 2-phenylethyl 2-phenylacetate and the other 3-PPB.

FIG. 15 shows gel/fusion curves for the 2-phenylethyl 2-phenylacetate and 3-PPB.

FIG. 16 shows initial, 1-day, 3-day and 7-day Brookfield viscosity data obtained for two plastisols, one comprising benzyl 3-phenylpropanoate (X-615) and the other 3-PPB (X-613).

FIG. 17 shows initial shear ramp results for two plastisols, one comprising benzyl 3-phenylpropanoate and the other 3-PPB.

FIG. 18 shows 1-day day shear ramp results for two plastisols, one comprising benzyl 3-phenylpropanoate and the other 3-PPB.

FIG. 19 shows 3-day day shear ramp results for two plastisols, one comprising benzyl 3-phenylpropanoate and the other 3-PPB.

FIG. 20 shows 7-day shear ramp results for two plastisols, one comprising benzyl 3-phenylpropanoate and the other 3-PPB.

FIG. 21 shows gel fusion results for two plastisols, one comprising benzyl 3-phenylpropanoate and the other 3-PPB.

FIG. 22 shows roll compatibility test results comparing benzyl 3-phenylpropanoate's performance with that of 3-PPB.

FIG. 23 shows initial viscosity response results comparing 3-PPB and the various inventive analogs of 3-PPB (HMCA benzoate (X-614), 2-phenylethyl 2-phenyl acetate (X-616), benzyl 3-phenylpropanoate (X-615)), to a traditional DEGDB/DPGDB diblend (KF850S, K-Flex® 850S) in a copolymer adhesive emulsion at plasticizer levels of 5, 10 and 15%, wet.

FIG. 24 shows 1-day viscosity response results comparing 3-PPB and the various inventive analogs of 3-PPB to the traditional DEGDB/DPGDB diblend in a copolymer adhesive emulsion at plasticizer levels of 5, 10 and 15%, wet.

FIG. 25 shows 3-day viscosity response data comparing 3-PPB and the various inventive analogs of 3-PPB to the traditional DEGDB/DPGDB diblend in a copolymer adhesive emulsion at plasticizer levels of 5, 10 and 15%, wet.

FIG. 26 shows 7-day viscosity response results comparing 3-PPB and the various inventive analogs of 3-PPB to the traditional DEGDB/DPGDB diblend in a copolymer adhesive emulsion at plasticizer levels of 5, 10 and 15%, wet.

FIG. 27 shows glass transition temperature (Tg) suppression results for 3-PPB and the various inventive analogs of 3-PPB as compared to the traditional DEGDB/DPGDB diblend in a copolymer adhesive emulsion at plasticizer levels of 5, 10 and 15%, wet.

FIG. 28 shows set times for 3-PPB and the various inventive analogs of 3-PPB as compared to the traditional DEGDB/DPGDB diblend in a copolymer adhesive emulsion at plasticizer levels of 5, 10 and 15%, wet.

FIG. 29 shows open times for 3-PPB and the various inventive analogs of 3-PPB as compared to the traditional DEGDB/DPGDB diblend in a copolymer adhesive emulsion at plasticizer levels of 5, 10 and 15%, wet.

FIG. 30 shows initial viscosity response results for 3-PPB and the various inventive analogs of 3-PPB as compared to the traditional DEGDB/DPGDB diblend in a homopolymer adhesive emulsion at plasticizer levels of 5, 10, 15 and 20%, wet.

FIG. 31 shows 1-day viscosity response results for 3-PPB and the various inventive analogs of 3-PPB as compared to the traditional DEGDB/DPGDB diblend in a homopolymer adhesive emulsion at plasticizer levels of 5, 10, 15 and 20%, wet.

FIG. 32 shows 3-day viscosity response results for 3-PPB and the various inventive analogs of 3-PPB as compared to the traditional DEGDB/DPGDB diblend in a homopolymer adhesive emulsion at plasticizer levels of 5, 10, 15 and 20%, wet.

FIG. 33 shows 7-day viscosity response results for 3-PPB and the various inventive analogs of 3-PPB as compared to the traditional DEGDB/DPGDB diblend in a homopolymer adhesive emulsion at plasticizer levels of 5, 10, 15 and 20%, wet.

FIG. 34 shows glass transition temperature (Tg) suppression results for 3-PPB and the various inventive analogs of 3-PPB as compared to the traditional DEGDB/DPGDB diblend in a homopolymer adhesive emulsion at plasticizer levels of 5, 10, 15 and 20%, wet.

FIG. 35 shows set times for homopolymer adhesive emulsions comprising 3-PPB and the various inventive analogs of 3-PPB as compared to the traditional DEGDB/DPGDB diblend at plasticizer levels of 5, 10, 15 and 20%, wet.

FIG. 36 shows open times for homopolymer adhesive emulsions comprising 3-PPB and the various analogs of 3-PPB as compared to the traditional DEGDB/DPGDB diblend at plasticizer levels of 5, 10, 15 and 20%, wet.

DETAILED DESCRIPTION OF THE INVENTION

The present invention is directed to analogs of the monobenzoate 3-PPB, which have been found to be surprisingly useful for a variety of applications as primary or secondary plasticizers, including, but not limited to, plastisols and adhesives. The analogs comprise 3-methyl-3-phenylpropyl benzoate (HMCA-benzoate), 2-phenylethyl 2-phenylacetate, benzyl 3-phenylpropanoate, and benzyl 2-methyl-3-phenylpropanoate, components not previously known or used as plasticizers in polymeric applications. The invention is also directed to polymeric compositions including without limitation plastisols, adhesives, paints and other polymeric coatings, sealants and caulks comprising the inventive 3-PPB analogs.

A preferred embodiment of the invention is HMCA benzoate in combination with a polymeric dispersion. Another preferred embodiment is 2-phenylethyl 2-phenylacetate in combination with a polymeric dispersion. Still another preferred embodiment is the use of the inventive analogs as secondary or diluent plasticizers in a blend with traditional plasticizers.

Structures for the inventive analogs as compared to 3-PPB are set forth below:

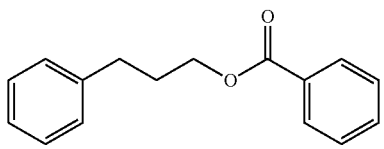

3-phenylpropyl benzoate
Chemical Formula $C_{16}H_{16}O_2$
Molecular Weight: 240.30

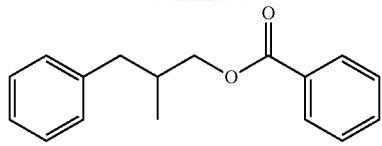

2-methyl-3-phenylpropyl benzoate
Chemical Formula $C_{17}H_{18}O_2$
Molecular Weight: 254.33

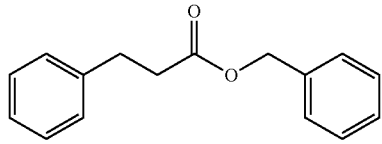

benzyl 3-phenylpropanoate
Chemical Formula $C_{16}H_{16}O_2$
Molecular Weight: 240.30

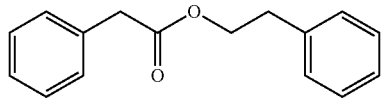

2-phenylethyl 2-phenylacetate
Chemical Formula $C_{16}H_{16}O_2$
Molecular Weight: 240.30

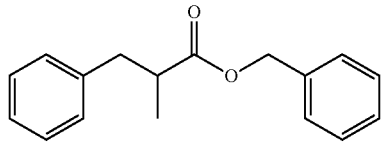

benzyl 2-methyl-3-phenylpropanoate
Chemical Formula $C_{17}H_{18}O_2$
Molecular Weight: 254.33

The inventive monobenzoate analogs can generally be utilized as either primary plasticizers or as secondary plasticizers in blends with other plasticizers in numerous polymeric dispersions, often as a substitute or alternative for conventional diluent plasticizers having a higher VOC content or plasticizers that have poor solvating and rheology characteristics or viscosity stability.

The present invention is not restricted to any particular polymer, although the invention may be described in terms of vinyl polymers. Any of the known polymers that can be formulated into a plastisol, melt compound, injection molding, extrusion, or calendaring polymer, adhesive, paint, sealant or caulk can be used in combination with one of the novel 3-PPB analogs to prepare a low VOC content composition having comparable or improved performance properties as compared to traditional plasticizers, in accordance with the present invention.

Notably, applications for the plasticizers of the present invention include use with numerous thermoplastic, thermoset, or elastomeric polymers often as an alternative for conventional plasticizers. By way of example, the inventive monobenzoate analogs may be used to prepare a reduced viscosity PVC, PVC copolymer or acrylic-based plastisol in accordance with the present invention. The inventive analogs are also useful in waterborne and non-waterborne adhesive compositions comprising polyvinyl acetate homo- and co-polymers.

Acrylic polymer compositions for which the inventive monobenzoate analogs are useful include various polyalkyl methacrylates, such as methyl methacrylate, ethyl methacrylate, butyl methacrylate, cyclohexyl methacrylate, or allyl methacrylate; or various aromatic methacrylates, such as benzyl methacrylate; or various alkyl acrylates, such as methyl acrylate, ethyl acrylate, butyl acrylate, or 2-ethylhexyl acrylate; or various acrylic acids, such as methacrylic acid and styrenated acrylics.

In addition to PVC, PVC copolymers and acrylic plastisols, the inventive monobenzoate analogs have utility for other polymeric compositions, both waterborne and non-aqueous, including but not limited to various homopolymers and copolymers comprising acrylics, vinyl acetate ethylene, vinylidene chloride, diethyl fumarate, diethyl maleate, or polyvinyl butyral; polyurethanes and copolymers thereof; polysulfides; cellulose nitrate; polyvinyl acetate and copolymers thereof; polyacrylates, methacrylates, styrene acrylates, and copolymers thereof; polychloroprenes; nitriles; polyamides.

Other polymers for which the inventive monobenzoate analogs may be useful as a plasticizer include epoxies, phenol-formaldehyde types; melamines; and the like. Still other polymers will be evident to one skilled in the art. Use of the inventive 3-PPB analogs is not meant to be limited to any particular polymer or polymer composition.

For purposes of the invention, "plastisol" means a liquid polymer composition comprising a particulate form of at least one non-crosslinked organic polymer dispersed in a liquid phase comprising a plasticizer for the polymer. As used in the invention, "plastisol" also means and includes an "organosol" that is a plastisol in which solvents, such as liquid hydrocarbons, ketones, or other organic liquids, are used in amounts greater than about 5 wt. % to control viscosity and other properties of a plastisol.

As used herein, "high solvator" or "high solvating" is a term that describes the plasticizer's efficiency in penetrating, thickening, and gelling solid plastisol before full physical properties are developed. All the plasticizer is absorbed into the PVC of a plastisol at lower temperatures than general purpose plasticizers, thus facilitating a faster formation of a homogenous phase.

As used herein, "inventive analog" or "inventive monobenzoate analog" or "3-PPB analog" are interchangeable and mean the novel compounds of the invention that are structurally similar to and/or derived from the monobenzoate 3-PPB as set forth herein, which heretofore have not been used as plasticizers as described herein.

The novel monobenzoate analogs of the present invention may be used as a low VOC substitute for other diluent plasticizers, such as isodecyl benzoate, or as alternative plasticizers for various traditional polymer dispersions, including without limitation vinyl applications.

The total amount of the inventive monobenzoate analogs used in any particular polymeric dispersion would range broadly depending on the particular polymer, the characteristics of the polymer and other components, the process, the application or use and the results desired. The total amount used would range broadly depending on the application, generally from about 1 to about 300, desirably from about 10 to about 100, and preferably from about 20 to about 80 parts by weight for every 100 total parts by weight of the one or more thermoplastic, thermoset, or elastomeric polymers, including without limitation those identified above.

For HMCA benzoate, a particularly preferred embodiment for a plastisol would include amounts of plasticizer ranging from 10 to 70 phr.

In adhesives, plasticizers range in amounts from about 1 to about 50 wt. %, preferably from about 5 to about 20 wt. %, based on the weight of the wet adhesive, also referred to as "%, wet". As an example, preferred embodiments for an adhesive include 10 wt. % in homopolymer polyvinyl acetate and 5 wt. % in vinyl acetate ethylene copolymers. As a general rule, the harder the polymer (higher Tg), the more plasticizer required.

Useful amounts are described herein and set forth in the examples. It is expected that one skilled in the art would be able to arrive at additional acceptable amounts based on the intended use and desired performance in the particular polymeric application.

The inventive plasticizers may be, but are not required to be, blended with various other conventional plasticizers to enhance or augment properties of polymeric compositions, including but not limited to improving compatibility and processability in a plastisol and enhancing solvating power. The inventive analogs are particularly useful to compatibilize poor solvating conventional plasticizers with a polymer. Some of these conventional plasticizers have been described herein and include, but are not limited to, various phthalate esters, phosphate esters, adipate, azelate, oleate, succinate and sebacate compounds, citrates, trimellitates, terephthalate esters such as DOTP, 1,2-cyclohexane dicarboxylate esters (such as Hexamoll® DINCH®), epoxy plasticizers, fatty acid esters, glycol derivatives, sulfonamides, sulfonic acid esters, benzoates, bioplasticizers, such as PG disoyate and PG monosoyate, chloroparaffins, polyesters, and various other hydrocarbons and hydrocarbon derivatives that are often utilized as secondary plasticizers, such as epoxidized soybean oil, and the like.

Monobenzoates, such as isononyl benzoate, isodecyl benzoate, and 2-ethylhexyl benzoate, as well as 2,2,4-trimethyl-1,3-pentanediol diisobutyrate (TXIB™, an Eastman trademark) can also be blended with the inventive monobenzoate analogs, or any of these can be replaced with the advantage that less is needed to achieve processable viscosity and rheology, improve gel/fusion and reduce volatility.

The inventive monobenzoate analogs may also be blended with solid plasticizers such as sucrose benzoate, dicyclohexyl phthalate, triphenyl phosphate, glycerol tribenzoate, 1,4-cyclohexane dimethanol (CHDM) dibenzoate, pentaerythritol tetrabenzoate, and alkyl glycol esters.

Other suitable plasticizers for use in combination with the inventive analogs will be known to one skilled in the art.

The inventive monobenzoate analogs may also be combined with or include various amounts of conventional additives such as oils, diluents, antioxidants, surfactants, heat stabilizers, flame retardants, surfactants, blending resins, waxes, solvents and the like, depending on the particular application or polymeric dispersion. Additives amounts can generally vary widely and often range from about 0.1 to about 75 parts by weight for every 100 parts by weight of the plastisol composition.

For vinyl applications, there are two different methods of fusing: plastisols and melt compounding. A plastisol is a liquid dispersion of PVC (or other polymer) in plasticizer, which may be heated as a spread coating, fused in slush molding, dip molding or rotationally molded. The plastisols of the invention may be compounded by simple mixing or blending, followed by de-aerating in most instances. Melt compounding is a process that uses heat and pressure while mixing to fuse vinyl (or other polymer). Its overall purpose is to combine the polymer and plasticizer into a homogeneous material which can be formed through a calendar, extruder or injection mold.

Exemplary formulations and preparation steps for simple basic starting plastisols and basic adhesive emulsions are set forth in the examples; however, the invention is not limited to these formulations. By way of example only, a typical basic plastisol is set forth below:

| | |
|---|---|
| Dispersion Resin, PVC | 100 phr |
| Plasticizer | 70 phr |
| Ca/Zn stabilizer | 3 phr |

By way of example only, a typical packaging adhesive is set forth below:

| | |
|---|---|
| Homopolymer or Copolymer | 100 parts |
| Plasticizer | 0-30 parts |
| Water | 0-20 parts |
| PVOH (88%) hydrolyzed | 0-100 parts |
| Fillers | 0-100 parts |
| Additives (wetting agents, defoamers) | 0.10 to 0.5 parts |

The inventive monobenzoate analogs provide a lower VOC content alternative over secondary and diluent type plasticizers and, depending on the application, provide comparable or better compatibility, viscosity stability, and rheology, among other advantages. In many instances, the inventive monobenzoate analogs may outperform industry standard plasticizers, including traditional and newer dibenzoate blends. Many traditional plasticizers have either high solvating properties or low viscosity, but not both. Surprisingly, the inventive monobenzoate analogs strike a good balance between high solvating power, better rheology and lower viscosity even when used alone.

For adhesives, the inventive monobenzoate analogs provide comparable or better compatibility, viscosity stability and response, rheology, set time, open time, Tg suppression, and MFFT, among other advantages, when compared to traditional dibenzoate plasticizers typically used in adhesives. The inventive monobenzoate analogs may be particularly useful as a plasticizer when considering the use of harder polymers as alternatives to softer polymers in a variety of low VOC formulations.

There are a large variety of uses for the plastisols and melt compounds of the invention, including but not limited to resilient flooring, wear layers, wall coverings, toys, gloves, and leather and textile applications.

The inventive monobenzoate analogs may be used in adhesive compositions, sealants and caulks for a large variety, including without limitation packaging glues, adhesive assembly, labeling, laminates, envelopes, food packaging, wood glue, construction adhesives, transportation product assembly, electronic product assembly and pressure sensitive adhesive (PSA) applications, although this list is by no means exhaustive.

Still other uses for the inventive monobenzoate analogs will be evident to one skilled in the art.

A variety of methods that may be used to prepare the inventive analogs are known to one skilled in the art. The inventive analogs are not limited to any particular method of preparation.

The invention is further described by the examples set forth herein, but is not limited thereby.

EXAMPLES

Experimental Methodology
Plastisol and Vinyl Preparation:
The plastisols were prepared in a Hobart Model N-50 mixer. A ten minute mix at speed one (1) was used. A high speed disperser was also used to prepare other plastisols evaluated employing a ten minute mix at 1000 RPM's. All of the plastisols were degassed at 1 mmHg until as completely air free as possible.

Tests/Evaluations

The goal was to determine the basic performance parameters of the inventive plasticizers. Tests demonstrating processability (viscosity, viscosity stability, rheology, and gel/fusion) were utilized. Unless otherwise indicated in specific examples, the general tests and/or methodologies described below were used in the examples. The tests and methods are known to one skilled in the art.

Test Methods

AR2000 Gel/Fusion Method: A 25 mm steel plate geometry was used in combination with the ETC (environmental test chamber). A gap of 400 µm was used. The temperature was ramped at a rate of 5° C./min. from 40° C. to 200° C. using a controlled strain of 2% and an angular frequency of 1 rad/sec.

AR2000 Shear Method, Steel Plate, Plastisol: A 20 mm steel plate geometry with Peltier plate and gap set to 200 µm was used. A dime-sized amount of plastisol was placed on the Peltier plate. The shear ramp was run at 25° C. from 0 to 1000 s$^{-1}$ over five minutes.

Brookfield Viscosity Method: The Brookfield viscosity was tested using the RVDVII+Pro Viscometer. A 30 second reading at 20 RPM's was taken; temperature was 23±1° C.

Roll Compatibility Test: A strip of vinyl was tightly rolled with yellow legal absorbent paper then placed in an oven at 60° C. for three days. Compatibility was judged on the degree of exudation in sum.

Sample Preparation: Prepared a ~400 g batch. Solids were added to liquids while mixing on low speed in Hobart or Kitchen Aid mixer. Mixed total of 10 minutes, (wiped solids down after 5 minutes). Degassed for 15 minutes.

Neat Plasticizer Volatility: TGA—approximately 10 mg of sample was placed into a platinum pan. The pan was quickly ramped to 110° C. and then held isothermally at that temperature for four hours under 160 ml/min air flow. Oven—ASTM D2369.

Materials

The following materials are used in the examples:
X-613—3-phenylpropyl benzoate or 3-PPB
X-614—HMCA benzoate
X-615—benzyl 3-phenylpropanoate
X-616—2-phenylethyl 2-phenylacetate Neat Plasticizer Properties—Volatility and Viscosity Preliminarily, the volatilities of the X-600 series plasticizers referenced above were determined via both ASTM D2369 and TGA (four hour isothermal hold at 110° C. under air). The ASTM D2369 results are shown in Table 1 below. X-614 had the lowest volatility of the 600 series plasticizers by both methods of testing. Using the TGA method, X-614 had almost 10% less weight loss after four hours than the other plasticizers (X-613, X-615 and X-616) of the series, which had comparable weight loss. (results not shown). X-615 and X-616 had moderately high volatility relative to X-613 and X-614, while their weight losses as evaluated by the TGA method were similar.

TABLE 1

ASTM D2369 Volatility of X-600 Series Plasticizers

| Experimental # | Chemical Name | Lot Number(s) | VOC (wt. %) |
|---|---|---|---|
| X-613 | 3-Phenylpropyl benzoate | AR060214C, EH042914C | 3.3, 3.7 |

TABLE 1-continued

ASTM D2369 Volatility of X-600 Series Plasticizers

| Experimental # | Chemical Name | Lot Number(s) | VOC (wt. %) |
|---|---|---|---|
| X-614 | 2-Methyl-3-phenylpropyl benzoate | CS071614A | 2.8 |
| X-615 | Benzyl-3-phenylpropanoate | CS080414B | 5.6 |
| X-616 | 2-Phenylethyl-2-phenylacetate | EH080614A | 4.5 |

The neat plasticizer viscosities (50 RPM) are shown below in Table 2. X-614 had the highest viscosity of the series.

TABLE 2

Viscosities of Neat Plasticizers

| Experimental # | Viscosity (mPa · s) | Temp. (° C.) |
|---|---|---|
| X-613 | 34.4 | 24.9 |
| X-614 | 48.8 | 24.8 |
| X-615 | 26.4 | 24.8 |
| X-616 | 28.8 | 25.0 |

Example 1—Basic Plastisol Evaluations (HMCA Benzoate)

Examples 1, 2 and 3 show the efficacy of the inventive monobenzoate analogs utilizing a basic starting plastisol formulation described below:

Basic Plastisol Formulation

| Material | PHR |
|---|---|
| Dispersion Resin, K76, Geon 121 A | 100 |
| Plasticizer | 70 |
| Ca/Zn stabilizer, Mark 1221 | 3 |

Processability

The inventive monobenzoate analog HMCA benzoate (X-614) was compared to 3-PPB (X-613). HMCA benzoate is very similar in structure to 3-PPB, with only the addition of a methyl group.

FIG. 1 and Table 3 below shows initial, 1-day, 4-day, 7-day, 2-week or 4-week viscosity data obtained for HMCA-benzoate (X-614), which compares favorably to 3-PPB (X-613) and reflects unexpectedly better viscosity stability.

TABLE 3

Brookfield Viscosity Measurements

| | Viscosity (mPa · s) | X-613 | X-614 |
|---|---|---|---|
| Initial | Temp (° C.) | 23.0 | 23.1 |
| | Viscosity (mPa · s) | 778 | 1042 |
| 1-Day | Temp (° C.) | 23.5 | 23.4 |
| | Viscosity (mPa · s) | 1336 | 1380 |
| 4-Day | Temp (° C.) | 23.7 | 23.5 |
| | Viscosity (mPa · s) | 1980 | 1642 |
| 7-Day | Temp (° C.) | 23.5 | 23.6 |
| | Viscosity (mPa · s) | 2705 | 1818 |
| 14-Day | Temp (° C.) | 23.8 | 23.4 |
| | Viscosity (mPa · s) | 4240 | 1920 |
| 28-Day | Temp (° C.) | 23.5 | 23.8 |
| | Viscosity (mPa · s) | 6560 | 1955 |

FIG. 2 shows the viscosity aging ratio obtained by comparing the 7-day viscosity data with the initial viscosity for both X-613 and X-614. The results demonstrated that the initial viscosity results of the two plasticizers were similar, while the viscosity aging of the inventive monobenzoate analog X-614 was notably less than X-613, indicating that X-614 is much more stable over time. Viscosity control is a significant advantage in plastisol applications and X-614 offers an alternative for improved plastisol storage stability over other plasticizers.

These results reflect that HMCA benzoate (X-614) is a viable alternative to 3-PPB (X-613) for use in plastisol compositions. Unexpectedly, HMCA benzoate has low viscosity, comparable rheology, good solvating properties and improved viscosity stability when compared with 3-PPB. It is also lower in cost, making it a very desirable alternative.

Rheology and Gel/Fusion

The basic 70 phr plastisol formulation above was again utilized to compare 3-PPB (X-613) to HMCA benzoate (X-614) to evaluate rheology and gel/fusion. Rheology data (initial, 1-day, 4-day, 7-day and 4-week shear data) and gel/fusion curves were obtained as reflected in FIGS. 3-7, respectively. FIG. 8 is a comparative curve showing the initial shear versus 7 day shear values for both HMCA benzoate and 3-PPB.

As shear rate was increased, higher and higher viscosity was expected. While the initial shear (FIG. 3) was a little higher for the X-614 plastisol, the aging of the X-614 plastisol was once again shown to be lower than that of X-613, with X-613's shear ramp curve being greater than that of X-614 after four days. In short, viscosity for HMCA benzoate remained level over time, while 3-PPB increased over time. These results demonstrate that HMCA benzoate has a much better rheology profile than 3-PPB.

Gel fusion data illustrates the relative solvation characteristics of various plasticizers. FIG. 9 shows the results of the gel/fusion evaluation, which reflected very similar results for 3-PPB as compared to HMCA benzoate. The results show that X-613 displays slightly better gel fusion temperatures. X-614 was only slightly lower in solvation, yet still comparable to typical dibenzoate solvation efficiency.

Past experiments have demonstrated that 3-PPB is far more efficient than isodecyl benzoate (IDB, a monobenzoate diluent plasticizer) as a solvator, yet viscosity and rheology are not sacrificed. The present data demonstrated that HMCA benzoate is a very viable alternative for 3-PPB, as it behaves very similarly with regard to viscosity reduction and gel/fusion. There are some slight sacrifices with respect to solvating ability, but the significant improvement in viscosity stability provide for a very viable reduced cost alternative.

Overall, the results demonstrated that HMCA benzoate imparts a combination of excellent rheology and very good solvation properties to a basic plastisols formulation.

Roll Test. A roll test was utilized to determine compatibility of X-614 in the basic plastisol formulation. (Results not shown.) Ratings were "0" for each day, indicating full compatibility.

The results above establish that HMCA benzoate is a compatible, high solvator having lower and more stable viscosity than 3-PPB, which make it suitable alone or in combination with other plasticizers for use in plastisol applications.

Example 2—Basic Plastisol Evaluation
2-Phenylethyl 2-Phenylacetate

Processability

The basic 70 phr plastisol formulation of Example 1 was also used in this evaluation.

FIG. 10 shows comparative initial, 1-day, 3-day, 7-day, 2-week, 3-week and 4-week viscosities for 3-PPB (X-613) and 2-phenylethyl 2-phenylacetate (X-616). X-616 is similar in structure to X-613, with the ester group shifted down one position further away from the aromatic ring. The data shows that the initial viscosities of X-616 and X-613 are similar, while the viscosity aging of the inventive X-616 plastisol is less than that of X-613. X-616's viscosity stability over time was much better than that obtained for 3-PPB, which provides an advantage in plastisol formulations. X-616's viscosity stability was not quite as good as that obtained for HMCA benzoate in Example 1, above, but it was still much improved over 3-PPB. Brookfield viscosity results are also shown in Table 4, below.

TABLE 4

Brookfield Viscosity Measurements

|  |  | X-613 Control | X-616 |
|---|---|---|---|
| Initial | Temp (° C.) | 24.0 | 23.2 |
|  | Viscosity (mPa · s) | 492 | 404 |
| 1-Day | Temp (° C.) | 23.5 | 23.2 |
|  | Viscosity (mPa · s) | 782 | 516 |
| 3-Day | Temp (° C.) | 23.8 | 23.7 |
|  | Viscosity (mPa · s) | 1090 | 608 |
| 7-Day | Temp (° C.) | 23.8 | 23.7 |
|  | Viscosity (mPa · s) | 1422 | 708 |
| 15-Day | Temp (° C.) | 23.3 | 24.1 |
|  | Viscosity (mPa · s) | 3030 | 1388 |
| 21-Day | Temp (° C.) | 23.9 | 24.0 |
|  | Viscosity (mPa · s) | 3650 | 1788 |
| 28-Day | Temp (° C.) | 23.6 | 23.8 |
|  | Viscosity (mPa · s) | 5460 | 1915 |

Rheology and Gel/Fusion

The basic 70 phr plastisol formulation of Example 1 was also used to compare 3-PPB (X-613) to 2-phenylethyl 2-phenylacetate (X-616) to evaluate rheology and gel/fusion. Rheology data (initial, 1-day, 3-day, and 7-day shear data) was obtained as reflected in FIGS. 11-14, respectively. The results are very similar for the initial and one day scans, while the three and seven day scans show more shear thickening with the X-613 plastisol versus the X-616 plastisol above about 400 s$^{-1}$. As shear rate was increased, higher and higher viscosity was expected. Like the X-614 results of Example 1, viscosity for 2-phenylethyl 2-phenylacetate (X-616) was higher initially than 3-PPB (X-613), but over time leveled off, while 3-PPB increased over time. These results show that 2-phenylethyl 2-phenylacetate (X-616) is comparable to 3-PPB (X-613) and has a better rheology profile.

Gel fusion data illustrates the relative solvation characteristics of various plasticizers. FIG. 15 shows the results of the gel/fusion evaluation, which reflected fairly similar results for 3-PPB (X-613) as compared to 2-phenylethyl 2-phenylacetate (X-616), which was only slightly lower in solvation characteristics.

Roll Test. The roll test was utilized to determine compatibility of X-616 in the 70 phr plastisol formulation. (Results not shown.) The ratings were "0" for each day, indicating full compatibility.

The results above establish that 2-phenylethyl 2-phenylacetate is viable option for plastisols. It is a compatible solvating plasticizer with low viscosity characteristics, with the added bonus of unexpectedly lower and more stable viscosity over time than that achieved with 3-PPB. As such, it is suitable alone or in combination with other more traditional plasticizers used in plastisol applications.

Example 3—Basic Plastisol Evaluation—Benzyl 3-Phenylpropanoate

Processability

The basic 70 phr plastisol formulation of Example 1 was used in this evaluation. Brookfield viscosity measurements for X-613 and benzyl 3-phenylpropanoate (X-615) are shown in Table 5 below. X-615 is similar in structure to X-613, with the ester group shifted one space away from the benzyl ring.

TABLE 5

Brookfield Viscosity Measurements

| | Description | X-613 Control | X-615 | X-615 Remake 1 | X-615 Remake 2 |
|---|---|---|---|---|---|
| Initial | Temp (° C.) | 22.5 | 22.5 | 23.9 | 23.1 |
| | Viscosity (mPa · s) | 596 | 3190 | 1566 | 1684 |
| | Spindle | 2 | 3 | 2 | 2 |
| 1-Day | Temp (° C.) | 22.3 | 22.2 | 24 | 23.3 |
| | Viscosity (mPa · s) | 856 | 1595 | 1782 | 995 |
| | Spindle | 2 | 3 | 2 | 3 |
| 3-Day | Temp (° C.) | 22.2 | 22.4 | 23.9 | 25 |
| | Viscosity (mPa · s) | 1190 | 3330 | 1100 | 1995 |
| | Spindle | 2 | 3 | 3 | 3 |
| 7-Day | Temp (° C.) | 23.5 | 23.7 | 23.9 | 23.6 |
| | Viscosity (mPa · s) | 1602 | 2190 | 1750 | 4965 |
| | Spindle | 2 | 3 | 3 | 3 (99%) |

The Brookfield viscosity results are also shown in FIG. 16.

The X-615 sample demonstrated unusual viscosity behavior, based on the choice of spindle, which had a very big impact on the viscosity results. Samples were remade to retest the viscosities and confirm the result. As shown in Table 6 below, a switch from spindle 2 to spindle 3 for one sample resulted in a viscosity decrease of over 50% at 1-day interval.

TABLE 6

Differences in X-615 Plastisol Viscosity from Spindle Change (1-Day Measurements)

| Sample ID | Temp ° C. | Viscosity (mPa · s) | Spindle |
|---|---|---|---|
| X-615A | 24.0 | 1782 | 2 |
| X-615A | 24.0 | 815 | 3 |

Rheology/Gel Fusion

The initial, 1-day, 3-day and 7-day shear ramp results are shown in FIGS. 17 through 20, respectively. The X-615 plastisol had consistently different (atypical) shear curve shapes than the plastisol comprising X-613.

The gel/fusion results of both plastisols are shown in FIG. 21. X-613 displayed slightly better gel/fusion temperatures, while X-615 had gel/fusion results more comparable to what is typically seen with dibenzoate blends. Even so, X-615 demonstrated acceptable gel/fusion results.

Roll Test. The roll test was additionally utilized to determine the compatibility of X-615 in the plastisol formulation. The results, shown in FIG. 22, indicated that X-615 is not fully compatible with vinyl.

The X-615 plasticizer demonstrated unusual behavior in the plastisol application, particularly with regard to its spindle-dependent viscosity response and somewhat atypical shear rate curves. Although gel/fusion results demonstrated good solvation power, the roll test demonstrated that there are compatibility problems with vinyl. Even so, X-615's compatibility is still on par with or slightly better than that seen of DOTP or DINCH in a plastisol. As such, it may still present a viable plasticizer for use in vinyl in combination with other plasticizers.

The plastisol evaluations above (Examples 1-3) demonstrate the utility of the inventive monobenzoate analogs. Traditional diluent plasticizers are highly volatile, making them poor choices for use in plastisols, in view of increasing regulatory scrutiny. Typical plasticizers known to the industry often have excellent solvation or excellent rheology characteristics, but not both. The present inventive monobenzoate analogs with their lower volatility, good solvation and rheology characteristics and improved viscosity stability also provide a very suitable blending plasticizer alternative for use with traditional plasticizers.

Example 4—Adhesive Evaluation

Test Methods

Materials

K-Flex® 850S (a traditional DEGDB/DPGDB diblend)

X-613: 3-PPB

X-614: HMCA benzoate

X-615: benzyl 3-phenylpropanoate

X-616: 2-phenylethyl 2-phenylacetate

Polyvinyl acetate homopolymer: Pace™ 383 (manufactured by H. B. Fuller)

Vinyl acetate ethylene copolymer: Elvace® 735 (manufactured by H. B. Fuller)

Preparation: Plasticizer was added to emulsion while mixing with a Jiffy blade at 750 RPM's. Total mixing time was ten minutes.

Brookfield Viscosity: The Brookfield viscosity was tested using a RVDVII+Pro Viscometer. A 30 second reading at 20 RPM's was taken; temperature was 23±1° C.

DSC Glass Transition: Twenty µL of emulsion was pipetted into a tared aluminum DSC pan with lid. The pan was allowed to dry in a 50° C. oven overnight, then reweighed to determine dry weight (approximately 10 mg). The lid was then placed on the pan and clamped shut. The DSC temperature was equilibrated at −40° C., then ramped at 5° C./min to 65° C. Glass transition was measured as the onset of Tg.

Open Time Method: A 1.5"×14" piece of 50 lb. unbleached Kraft paper was placed on a glass surface, with a 1"×14" piece of Kraft clipped to its top, rolled back so that the bottom piece was left uncovered. The top piece was sandwiched between a #0 and #14 wire wound rod with the #0 on top. A small amount of adhesive was applied to the top of the bottom strip and a #20 wire wound rod metered out the adhesive over the entire strip. A timer was started, and at a specified time interval (with intervals of 5 seconds) the top strip was laminated to the bottom using the #0 rod. The strips were then peeled apart and assessed for adhesion and fiber tear. This process was repeated until a specific time interval was confirmed in duplicate as the last time interval to result in significant fiber tear/adhesion. Evaluations were performed blind.

Set Time Method: Set time determinations were made using two strips of 50 lb. unbleached Kraft paper measuring 1"×14" (top) and 1.5"×14" (bottom). A small amount of adhesive was applied to the bottom strip, and a #20 wire wound rod metered the adhesive onto the bottom strip while a #16 wire wound rod (rubber banded to the #20) simultaneously pressed down the top strip. A timer was then immediately started and the strips were pulled apart until significant force was required to tear apart the strips and fiber tear was noted. Time at this point was recorded as the set time. A minimum of three repetitions were performed. Evaluations were performed blind.

X-613, X-614, X-615 and X-616 (as described above) were evaluated in both a copolymer (VAE, Elvace® 735) and homopolymer (PVAc, Pace™ 383) adhesive emulsions. K-Flex® 850S was also evaluated for comparison. Plasticizers were evaluated at levels of 5%, 10% and 15%, wet for the copolymer and levels of 5%, 10%, 15%, and 20%, wet, for the homopolymer. For the purposes of the evaluation, "wet" means the loading amount in weight percent (wt. %) of the plasticizer incorporated into the polymeric emulsion.

In both emulsion systems, the X-600 plasticizers tended to depress Tg more strongly than a traditional dibenzoate diblend (K-Flex® 850S). In the copolymer, the X-600 series plasticizers performed similarly in the other aspects of testing to the diblend. In the homopolymers, the viscosity suppression, set times, and open times were generally slightly poorer with the X-600 plasticizers than with the diblend, although performance was acceptable.

Copolymer Viscosity Response

The copolymer viscosity response results (Temp~22-23° C.) for initial, 1-day, 3-day and 7-day are shown in FIGS. 23 through 26 and Table 7, below. The responses were all very similar showing good compatibility with the base copolymer.

TABLE 7

Copolymer Viscosity Response Data

| Plasticizer | Wt. % | Viscosity (cP) | | | |
|---|---|---|---|---|---|
| | | Initial | 1-Day | 3-Day | 7-Day |
| Blank | 0 | 2005 | 2080 | 2020 | 2120 |
| K-FLEX ® 850S | 5 | 3400 | 3530 | 3410 | 3680 |
| | 10 | 7070 | 7140 | 6960 | 7160 |
| | 15 | 14920 | 14840 | 15440 | 14960 |
| X-613 | 5 | 3400 | 3550 | 3530 | 3770 |
| | 10 | 7280 | 7040 | 7220 | 7080 |
| | 15 | 15920 | 16040 | 15660 | 15980 |
| X-614 | 5 | 3420 | 3720 | 3720 | 4020 |
| | 10 | 7320 | 7280 | 7300 | 7240 |
| | 15 | 15000 | 15800 | 15180 | 15720 |
| X-615 | 5 | 3510 | 3610 | 3460 | 3600 |
| | 10 | 6960 | 7140 | 7100 | 7140 |
| | 15 | 15800 | 16060 | 15960 | 15480 |
| X-616 | 5 | 3620 | 3550 | 3570 | 3770 |
| | 10 | 7160 | 7340 | 7240 | 7260 |
| | 15 | 15500 | 15740 | 15800 | 15880 |

Table 8, below, shows viscosity data obtained for homopolymers.

TABLE 8

Homopolymer Viscosity Response Data

| Plasticizer | Wt. % | Viscosity (cP) | | | |
|---|---|---|---|---|---|
| | | Initial | 1-Day | 3-Day | 7-Day |
| Blank | 0 | 3800 | 3740 | 3830 | 3760 |
| K-FLEX ® 850S | 5 | 5790 | 5110 | 4530 | 4460 |
| | 10 | 5840 | 5980 | 6010 | 5870 |
| | 15 | 8620 | 8540 | 8490 | 8020 |
| | 20 | 11660 | 11980 | 11440 | 11500 |
| X-613 | 5 | 4260 | 4170 | 4230 | 4300 |
| | 10 | 5800 | 5740 | 5730 | 5860 |
| | 15 | 7620 | 7680 | 7760 | 7630 |
| | 20 | 11180 | 11180 | 11400 | 11380 |

TABLE 8-continued

Homopolymer Viscosity Response Data

| Plasticizer | Wt. % | Viscosity (cP) | | | |
|---|---|---|---|---|---|
| | | Initial | 1-Day | 3-Day | 7-Day |
| X-614 | 5 | 4310 | 4360 | 4340 | 4420 |
| | 10 | 5210 | 5510 | 5530 | 5570 |
| | 15 | 7340 | 8260 | 8210 | 8190 |
| | 20 | 11940 | 13000 | 12880 | 13200 |
| X-615 | 5 | 3920 | 4180 | 4120 | 4250 |
| | 10 | 5000 | 5290 | 5180 | 5290 |
| | 15 | 7250 | 7340 | 7140 | 7210 |
| | 20 | 10200 | 11740 | 10920 | 11000 |
| X-616 | 5 | 4150 | 4170 | 4080 | 4140 |
| | 10 | 5050 | 5340 | 5380 | 5320 |
| | 15 | 7150 | 7440 | 7450 | 7560 |
| | 20 | 11260 | 11980 | 11760 | 12000 |

Copolymer Glass Transition Temperature Suppression

The copolymer glass transition temperature results are shown in FIG. 27. While all of the X-600 series plasticizers were more effective in lowering glass transition temperature than the traditional DEGDB/DPGDB diblend (K-Flex° 850 S), X-615 and X-616 had the most dramatic effect across all concentration levels, indicating a more flexible polymer and more efficient plasticizer.

Copolymer Set and Open Times

The copolymer set times (FIG. 28) and open times (FIG. 29) demonstrated very similar performance among all plasticizers evaluated. Set time results demonstrate that the X-600 series plasticizers had similar bond formation time in the same polymeric adhesive as the traditionally used DEGDB/DPGDB diblend.

Homopolymer Viscosity Response

The homopolymer viscosity response results for initial through seven days are shown in FIGS. 30-33 and Table 8 above. X-614 behaved very similarly to the traditional diblend (K-Flex° 850S), while the other X-600 series plasticizers generally seemed slightly less efficient in increasing homopolymer viscosity. Still, the results show compatibility with the base polymer.

Homopolymer Glass Transition Temperature Suppression

The glass transition temperature suppression results for the homopolymers emulsion are shown in FIG. 34. X-613 and X-614 performed very similarly to the traditional diblend (K-Flex° 850S), while the X-615 and X-616 were notably more efficient in dropping Tg as was encountered with the copolymer evaluations.

Homopolymer Set and Open Times

The homopolymers set times, shown in FIG. 35, indicate that at levels up to 15% of X-600 series are notably poorer in reducing set time than K-FLEX® 850S. The open times, shown in FIG. 36, indicate similar performance between K-FLEX® 850S, X-615 and X-616, with poorer performance in the X-613 and X-614 samples. Depending on particular set and open time requirements and application, the X-600 series plasticizers may provide a viable alternative even though performing poorly in the set time and some of the open time evaluations.

Table 9, below, reflects data obtained for film clarity, Tg (5 C°/min), set time and open time for 5, 10 and 15% plasticizer levels, wet. Table 10 reflects the same data set for homopolymers adhesive formulations for 5, 10, 15 and 20% plasticizer levels, wet. No clarity data was obtained for X-616.

TABLE 9

Copolymer Film Clarity, Tg and Set/Open Times

| Plasticizer | Wt. % | Film Clarity 1-Day | Film Clarity 7-Day | Tg (5 C./min) (° C.) | Set Time (s) | Open Time (s) |
|---|---|---|---|---|---|---|
| Blank | 0 | 8 | 7 | 3.0 | | |
| K-FLEX® 850S | 5 | 9 | 8 | −5.7 | 7.3 | 30 |
| | 10 | 9 | 8 | −8.11 | 7.0 | 40 |
| | 15 | 9 | 9 | −14.7 | 5.0 | 45 |
| X-613 | 5 | 9 | 8 | −9.4 | 7.3 | 30 |
| | 10 | 9 | 8 | −13.64 | 7.0 | 35 |
| | 15 | 9 | 9 | −17.9 | 6.0 | 45 |
| X-614 | 5 | 9 | 8 | −7.5 | 6.3 | 30 |
| | 10 | 9 | 8 | −10.58 | 5.7 | 40 |
| | 15 | 9 | 9 | −22.8 | 5.7 | 45 |
| X-615 | 5 | 9 | 8 | −9.2 | 8.0 | 30 |
| | 10 | 9 | 8 | −14.92 | 6.3 | 40 |
| | 15 | 9 | 9 | −21.6 | 5.7 | 45 |
| X-616 | 5 | 9 | 8 | −9.6 | 7.7 | 30 |
| | 10 | 9 | 8 | −14.55 | 6.3 | 40 |
| | 15 | 9 | 9 | −22.6 | 5.7 | 45 |

TABLE 10

Homopolymer Film Clarity, Tg and Set/Open Times

| Plasticizer | Wt. % | Film Clarity 1-Day | Film Clarity 7-Day | Tg (5 C./min) (° C.) | Set Time (s) | Open Time (s) |
|---|---|---|---|---|---|---|
| Blank | 0 | 7 | 7 | 33.5 | 9.3 | 10 |
| K-FLEX® 850S | 5 | 8 | 8 | 18.2 | 7.0 | 15 |
| | 10 | 9 | 9 | 8.4 | 6.0 | 25 |
| | 15 | 9 | 9 | −1.4 | 5.7 | 35 |
| | 20 | 9 | 9 | −10.9 | 4.3 | 45 |
| X-613 | 5 | 8 | 8 | 18.2 | 9.0 | 15 |
| | 10 | 8 | 9 | 7.7 | 7.7 | 20 |
| | 15 | 9 | 9 | −5.1 | 6.7 | 30 |
| | 20 | 9 | 9 | −16.1 | 5.7 | 40 |
| X-614 | 5 | 8 | 8 | 19.7 | 8.7 | 10 |
| | 10 | 8 | 9 | 7.4 | 7.3 | 20 |
| | 15 | 9 | 9 | −1.2 | 6.7 | 30 |
| | 20 | 9 | 9 | −10.9 | 4.7 | 40 |
| X-615 | 5 | 8 | 9 | 12.5 | 8.7 | 15 |
| | 10 | 9 | 9 | 2 | 7.7 | 25 |
| | 15 | 9 | 9 | −11 | 7.3 | 40 |
| | 20 | 10 | 9 | −19.4 | 6.0 | 45 |
| X-616 | 5 | | | 13.8 | 8.3 | 15 |
| | 10 | | | 0.9 | 7.3 | 30 |
| | 15 | | | −10.8 | 6.7 | 40 |
| | 20 | | | −18.6 | 4.7 | 45 |

While the X-600 series plasticizers evaluated in this example did not have any particular aspect that stood out aside from Tg suppression, they were generally found to be compatible and to produce similar performance to the traditional diblend, particularly in the copolymer system. Therefore, it would be expected that any member of this series could serve as a plasticizer in a waterborne adhesive depending on the particular requirements and application.

In accordance with the patent statutes, the best mode and preferred embodiments have been set forth; the scope of the invention is not limited thereto, but rather by the scope of the attached claims.

What is claimed is:

1. A plastisol composition comprising polymer particles dispersed in a plasticizer, wherein the plasticizer for dispersing the polymer particles consists of 2-methyl-3-phenylpropyl benzoate, 2-phenylethyl 2-phenylacetate, benzyl 3-phenylpropanoate, or benzyl 2-methyl-3-phenylpropanoate
present in amounts ranging from about 20 parts to about 80 parts per 100 parts by weight of the polymer particles, wherein the plasticizer maintains viscosity stability over time.

2. The plastisol composition of claim 1, further comprising another plasticizer that is a phthalate ester, a phosphate ester, an adipate, an azelate, an oleate, a succinate, a sebacate, a citrate, a trimellitate, a terephthalate ester, a 1,2-cyclohexane dicarboxylate ester, an epoxy plasticizer, a fatty acid ester, a glycol derivative, a sulfonamide, a sulfonic acid ester, a benzoate, a bioplasticizer, a chloroparaffin, a polyester, a hydrocarbon, a hydrocarbon derivative, or mixtures thereof.

3. The plastisol composition of claim 1, further comprising any of isononyl benzoate, isodecyl benzoate, 2-ethylhexyl benzoate, 2,2,4-trimethyl-1,3-pentanediol diisobutyrate, epoxidized soybean oil, PG disoyate, PG monosoyate, or mixtures thereof.

4. The plastisol composition of claim 1, further comprising a solid plasticizer that is sucrose benzoate, dicyclohexyl phthalate, triphenyl phosphate, glycerol tribenzoate, 1,4-cyclohexane dimethanol (CHDM) dibenzoate, pentaerythritol tetrabenzoate, an alkyl glycol ester, or mixtures thereof.

5. A plastisol composition comprising:
polymer particles dispersed in a plasticizer, wherein the polymer comprises polyvinyl chloride, a polyvinyl chloride copolymer or an acrylic-based polymer;
wherein the plasticizer for dispersing the polymer particles consists of 2-methyl-3-phenylpropyl benzoate, 2-phenylethyl 2-phenylacetate, benzyl 3-phenylpropanoate, or benzyl 2-methyl-3-phenyl-propanoate, present in amounts ranging from about 20 parts to about 80 parts per 100 parts by weight of the polymer,
wherein the plasticizer is used alone as a primary plasticizer or as a secondary plasticizer in combination with other plasticizers, and
wherein the plasticizer maintains viscosity stability over time.

6. The plastisol of claim 5, wherein the acrylic-based polymer comprises polyalkyl methacrylates, aromatic methacrylates, alkyl acrylates, acrylic acids, or styrenated acrylics.

7. The plastisol of claim 5 wherein the plasticizer is present in amounts of about 70 parts per hundred parts by weight of the polymer.

8. An adhesive composition comprising:
a. a polymeric emulsion comprising polyvinyl acetate or vinyl acetate ethylene; and
b. a plasticizer selected from the group consisting of 2-methyl-3-phenylpropyl benzoate, 2-phenylethyl 2-phenylacetate, benzyl 3-phenylpropanoate or benzyl 2-methyl-3-phenylpropanoate, present in amounts ranging from about 1 to about 20%, wet.

* * * * *